(12) United States Patent
Kang et al.

(10) Patent No.: US 11,470,246 B2
(45) Date of Patent: Oct. 11, 2022

(54) INTELLIGENT PHOTOGRAPHING METHOD AND SYSTEM, AND RELATED APPARATUS

(71) Applicant: Huawei Technologies Co., Ltd., Shenzhen (CN)

(72) Inventors: Fengxia Kang, Nanjing (CN); Shaojun Chen, Shanghai (CN); Hao Chen, Shenzhen (CN); Shengfeng Zhou, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/284,906

(22) PCT Filed: Oct. 15, 2018

(86) PCT No.: PCT/CN2018/110247
§ 371 (c)(1),
(2) Date: Apr. 13, 2021

(87) PCT Pub. No.: WO2020/077494
PCT Pub. Date: Apr. 23, 2020

(65) Prior Publication Data
US 2021/0385370 A1    Dec. 9, 2021

(51) Int. Cl.
*H04N 5/232* (2006.01)
*G06V 40/13* (2022.01)
*G06V 40/16* (2022.01)

(52) U.S. Cl.
CPC ..... *H04N 5/23222* (2013.01); *H04N 5/23219* (2013.01); *H04N 5/23225* (2013.01);
(Continued)

(58) Field of Classification Search
CPC .......... H04N 5/23206; H04N 5/23216; H04N 5/23225; H04N 5/23219; H04N 5/232935;
(Continued)

(56) References Cited

U.S. PATENT DOCUMENTS

2004/0183828 A1   9/2004  Nichogi et al.
2008/0180543 A1   7/2008  Okamoto
(Continued)

FOREIGN PATENT DOCUMENTS

CN         1517915 A      8/2004
CN       103338329 A     10/2013
(Continued)

OTHER PUBLICATIONS

ITU-T H.264, "Series H: Audiovisual and Multimedia Systems, Infrastructure of audiovisual services-Coding of moving video, Advanced video coding for generic audiovisual services," Apr. 2017, 812 pages.

*Primary Examiner* — Xi Wang
(74) *Attorney, Agent, or Firm* — Conley Rose, P.C.

(57) ABSTRACT

An intelligent photographing method includes extracting, by a terminal, one or more first tags from common data of a user, where the common data represents an identity feature of the user, extracting, by the terminal, one or more second tags from photographing-related data of the user, where the photographing-related data represents a photographing preference of the user, determining, by the terminal, a third tag based on the one or more first tags and the one or more second tags, and obtaining a picture and adjusting, by the terminal, picture quality of the picture based on a picture quality effect parameter set corresponding to the third tag.

19 Claims, 24 Drawing Sheets

(52) U.S. Cl.
CPC ....... *H04N 5/232935* (2018.08); *G06V 40/13* (2022.01); *G06V 40/161* (2022.01)

(58) Field of Classification Search
CPC ................ H04N 5/23222; H04N 5/232; G06F 17/30268; G06K 9/6202
USPC ........ 348/231.6, 231.5, 231.99, 231.3, 222.1
See application file for complete search history.

(56) References Cited

U.S. PATENT DOCUMENTS

| | | |
|---|---|---|
| 2016/0127653 A1 | 5/2016 | Lee et al. |
| 2016/0284007 A1 | 9/2016 | Sakai |
| 2018/0041696 A1* | 2/2018 | Balasubramanian ........................ H04N 5/23216 |

FOREIGN PATENT DOCUMENTS

| | | |
|---|---|---|
| CN | 103841329 A | 6/2014 |
| CN | 104980662 A | 10/2015 |
| CN | 105955708 A | 9/2016 |
| CN | 106155592 A | 11/2016 |
| CN | 107332981 A | 11/2017 |
| CN | 107730442 A | 2/2018 |
| CN | 107862654 A | 3/2018 |
| CN | 108122029 A | 6/2018 |
| CN | 108540722 A | 9/2018 |
| EP | 3022896 B1 | 5/2021 |
| KR | 101405091 B1 | 6/2014 |

* cited by examiner

| Fusion feature tag | Fusion feature tag score |
|---|---|
| Light beautification | 1.54 |
| Freshness | 1.96 |
| Japanese style | 1.3 |

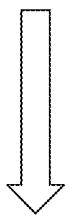

A score of "Freshness" is the highest

Correspondence table of a fusion feature tag and a PQ effect parameter

| Fusion feature tag | PQ effect parameter |
|---|---|
| Light beautification | Parameter set 1 |
| Freshness | Parameter set 2 |
| Japanese style | Parameter set 3 |

Intelligent photographing tag and a corresponding PQ effect parameter set

| Intelligent photographing tag | PQ effect parameter |
|---|---|
| Freshness | Parameter set 3 |

FIG. 12

User database 1300

| Data element | User data | | Valid data | | | Feature value | | |
|---|---|---|---|---|---|---|---|---|
| | Common data | Photographing-related data | Photographing parameter | PQ effect parameter | Valid common data | Common feature | Photographing-related feature | Fusion feature |
| 1 | Common data 1 | Photographing-related data 1 | Photographing parameter set 1 | PQ effect parameter set 1 | Data 1 | Common feature ID 1 | Photographing-related feature ID 1 | Fusion feature ID 1 |
| 2 | Common data 2 | Photographing-related data 2 | Photographing parameter set 2 | PQ effect parameter set 2 | Data 2 | Common feature ID 2 | Photographing-related feature ID 2 | Fusion feature ID 2 |
| 3 | Common data 3 | Photographing-related data 3 | Photographing parameter set 3 | PQ effect parameter set 3 | Data 3 | Common feature ID 3 | Photographing-related feature ID 3 | Fusion feature ID 3 |
| ... | ... | ... | ... | ... | ... | ... | ... | ... |

FIG. 13

INTELLIGENT PHOTOGRAPHING METHOD AND SYSTEM, AND RELATED APPARATUS

CROSS-REFERENCE TO RELATED APPLICATIONS

This application is a U.S. National Stage of International Patent Application No. PCT/CN2018/110247 filed on Oct. 15, 2018, which is hereby incorporated by reference in its entirety.

TECHNICAL FIELD

This application relates to the field of electronic technologies, and in particular, to an intelligent photographing method and system, and a related apparatus.

BACKGROUND

With the development of the field of artificial intelligence technologies, intelligent terminal devices have also been developed in depth. Taking photos by using an intelligent terminal device to record every detail in life has become a way of life for people. Therefore, people pay more attention to a picture effect of a photo taken by using the intelligent terminal device.

Currently, after photographing is completed and before a picture format is formed, the intelligent terminal device first analyzes a photographed object and an environment of picture data, performs corresponding beautification processing based on an analysis result, and then further forms the picture format by using the beautified picture data. However, because the intelligent terminal device processes the picture data for all users, personalized preferences and requirements of different users for photographing effects cannot be met.

SUMMARY

This application provides an intelligent photographing method and system, and a related apparatus, to provide a user with a photographing effect that conforms to a personalized preference of the user, thereby improving user experience.

According to a first aspect, this application provides an intelligent photographing method, including: First, a terminal extracts one or more first tags from common data of a user. The common data is used to represent an identity feature of the user. Then, the terminal extracts one or more second tags from photographing-related data of the user. The photographing-related data is used to represent a photographing preference of the user. Next, the terminal determines a third tag based on the one or more first tags and the one or more second tags. Finally, the terminal adjusts, based on a picture quality effect parameter set corresponding to the third tag, picture quality of a picture taken by the terminal.

In this embodiment of this application, the terminal may collect user data, extract the first tag indicating the identity feature of the user, extract the second tag indicating the photographing preference of the user, and obtain the third tag of the user through fusion based on the first tag and the second tag. In other words, the third tag is obtained through fusing the identity feature of the user with the photographing preference of the user. Then, the terminal assists, by using the picture quality effect parameter set corresponding to the third tag, the user in photographing with a photographing effect conforming to a user feature, and provides the user with the photographing effect conforming to a user personality, thereby improving user experience.

In a possible ease, that the terminal extracts the one or more first tags from common data may specifically include: The terminal extracts, based on a first mapping relationship, the one or more first tags corresponding to the common data. The first mapping relationship includes mapping between a plurality of groups of common data and a plurality of first tags. In this way, the terminal may match the common data with the first mapping relationship, to obtain a common feature tag of the user, that is, the first tag. Therefore, the terminal can quickly extract the common feature tag of the user.

In a possible ease, that the terminal extracts one or more first tags from photographing-related data may specifically include: First, the terminal extracts one or more first photographing-related parameter sets from the photographing-related data. Then, the terminal inputs the one or more first photographing-related parameter sets to a first neural network model, to obtain one or more first score vector sets. The first score vector set includes first scores of a plurality of fourth tags, and the first score is used to represent a matching degree between the first photographing-related parameter set and the fourth tag. Next, the terminal determines the one or more second tags in the plurality of fourth tags based on the first score vector sets respectively corresponding to the one or more first photographing-related parameter sets. In other words, the terminal may extract the feature tag from the photographing-related data by using the neural network model. In this way, the terminal may use a self-learning capability of the neural network model to improve accuracy of extracting the feature tag from the photographing-related data by the terminal.

In a possible case, the one or more second tags include one or more fourth tags whose first scores are greater than a first threshold in the first score vector sets respectively corresponding to the one or more first photographing-related parameter sets. In other words, the terminal may determine, as the one or more second tags, the one or more fourth tags whose fourth scores are greater than the first threshold. Because a value of the first score is used to indicate a matching degree between the user and the fourth tag, a larger first score indicates a higher matching degree between the photographing-related data of the user and the fourth tag. In this way, the terminal may extract the one or more second tags that conform to a photographing-related data feature of the user.

In a possible case, the one or more second tags include one or more fourth tags whose first scores are the highest in a first score vector set corresponding to each first photographing-related parameter set. In other words, the terminal extracts the one or more fourth tags with the highest first scores in the first score vector sets of the user, and determines the one or more second tags. In this way, the terminal can improve accuracy of extracting the one or more second tags of the user.

In a possible case, before the terminal inputs the one or more first photographing-related parameter sets to a first neural network model, the terminal may obtain sample data. The sample data includes a plurality of groups of first training sets. Each group of first training sets include one group of second photographing-related parameter sets and one group of second score vector sets. The terminal trains the first neural network model based on the sample data by using a deep learning algorithm, in other words, the terminal may continuously train the neural network model based on the sample data. In this way, the terminal can improve accuracy of extracting the one or more second tags of the user.

In a possible case, the terminal displays a first interface. The first interface includes a plurality of sample pictures. Each sample picture corresponds to one group of second photographing-related parameter sets and one group of second score vector sets. The second photographing-related parameter set is used to represent picture quality of the sample picture, and the second score vector set includes first scores of a plurality of fourth tags corresponding to the sample pictures. The terminal receives a first, input operation of selecting one or more training pictures from the plurality of sample pictures by the user. In response to the first input operation, the terminal may determine the second photographing-related parameter set and the second score vector set that are corresponding to the one or more training pictures, as the sample data. In other words, the terminal may train the first neural network model by using sample data corresponding to a sample picture preselected by the user. In this way, the terminal can extract one or more second feature tags that conform to a personalized photographing preference of the user.

In a possible case, the terminal may determine whether a quantity of the sample pictures is less than a training quantity. If the quantity of the sample pictures is less than the training quantity, the terminal selects, as the sample data, one or more groups of second photographing-related parameter sets and second score vector sets from a prestored training set database. In other words, the terminal may use a prestored training set to train a first neural network when the quantity of the sample pictures selected by the user is insufficient, thereby reducing input operations of the user and improving user experience.

In a possible case, each first tag and each second tag jointly correspond to an association score. A value of the association score is used to represent an association degree between the first tag and the second tag. The method specifically includes: First, the terminal may determine a total association score $T_i=L_1*(\Sigma_{k=1}^{R}W_k)+L_2$ of each second tag based on the one or more first tags and the one or more second tags. Herein, $T_i$ is a total association score of an $i^{th}$ second tag in the one or more second tags, $L_1$ is a weight of the one or more first tags, $L_2$ is a weight of the one or more second tags, $W_k$ is an association score corresponding to a $k^{th}$ first tag in the one or more first tags and the $i^{th}$ second tag jointly, and R is a quantity of the one or more first tags. Then, the terminal determines the third tag based on the total association score of each second tag. The third tag is a tag with a highest total association score in the one or more second tags. In other words, the terminal may set a weight for the first tag of the user and a weight for the second tag of the user, and set an association degree value corresponding to each first tag and each second tag. In this way, the terminal can recommend a picture quality adjustment parameter to the user, to better conform to a personalized preference of the user, thereby improving user experience.

According to a second aspect, this application provides a terminal, including one or more processors and one or more memories. The one or more memories are coupled to the one or more processors. The one or more memories are configured to store computer program code. The computer program code includes a computer instruction. When the one or more processors execute the computer instruction, a communications apparatus performs the intelligent photographing method in any possible implementation of any foregoing aspect.

According to a third aspect, an embodiment of this application provides a computer storage medium, including a computer instruction. When the computer instruction is run on an electronic device, a communications apparatus is enabled to perform the intelligent photographing method in any possible implementation of any foregoing aspect.

According to a fourth aspect, an embodiment of this application provides a computer program product. When the computer program product is run on a computer, the computer is enabled to perform the intelligent photographing method in any possible implementation of any foregoing aspect.

BRIEF DESCRIPTION OF DRAWINGS

To describe the technical solutions in the embodiments of this application or in the prior art more clearly, the following briefly describes the accompanying drawings for describing the embodiments or the prior art.

FIG. 12 is a schematic flowchart of setting a parameter during photographing performed by a terminal according to an embodiment of this application;

FIG. 13 is a schematic structural diagram of a user database according to an embodiment of this application.

DESCRIPTION OF EMBODIMENTS

The technical solutions according to embodiments of this application are clearly and completely described in the following with reference to the accompanying drawings. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "a plurality of" means two or more than two.

Figure 1:
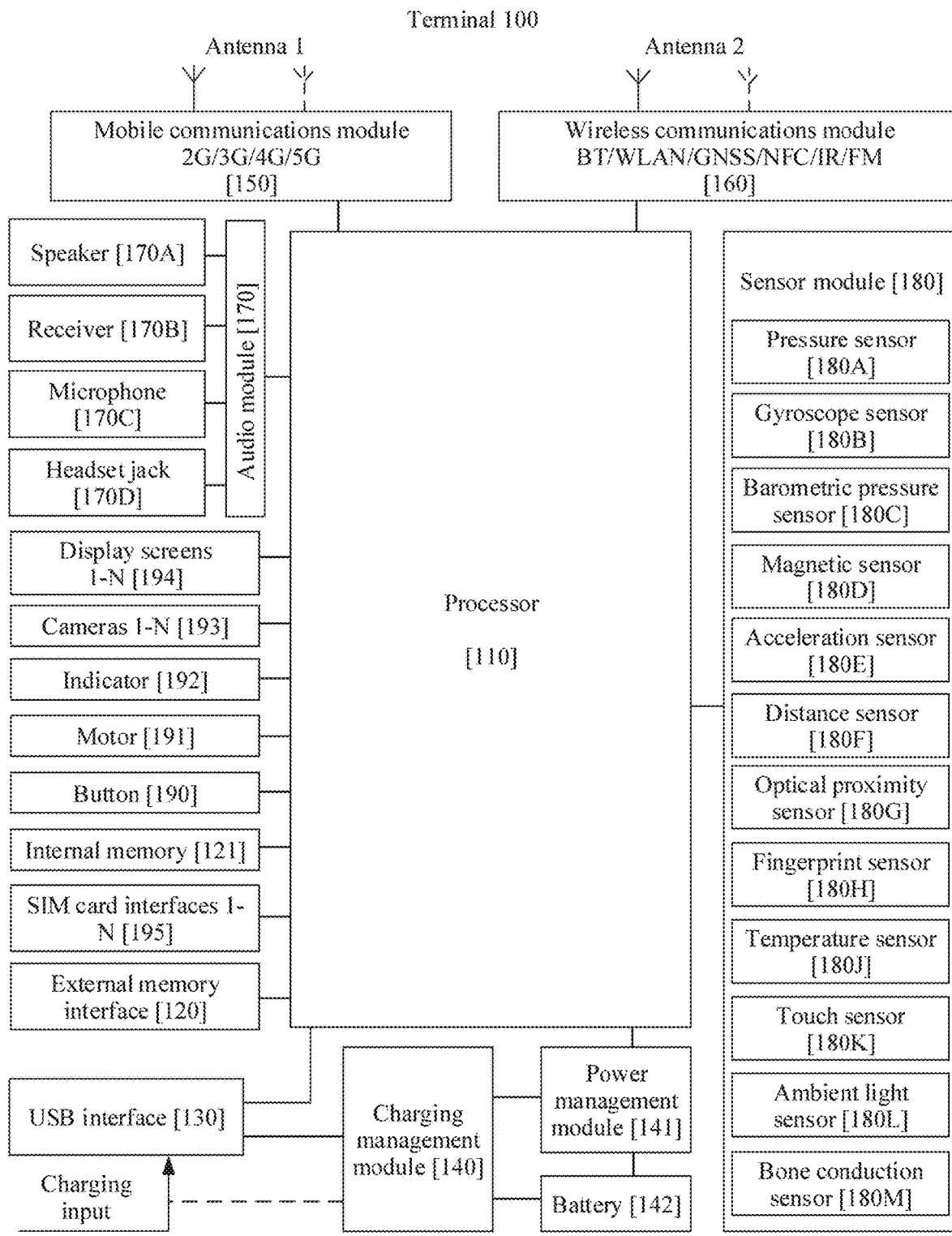
FIG. 1 is a schematic structural diagram of a terminal according to an embodiment of this application.

FIG. 1 is a schematic structural diagram of a terminal 100.

As shown in the FIG. 1, the terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180I, a touch sensor 180K, an ambient light sensor 180L, a bone conduction sensor 180M, and the like.

It may be understood that the illustrated structure in the embodiments of the present invention does not constitute a specific limitation on the terminal 100. In some other embodiments of this application, the terminal 100 may include more or fewer components than those shown in the figure, or some components may be combined, or some components may be divided, or different component arrangements may be used. The components shown in the figure may be implemented by hardware, software, or a combination of software and hardware.

The processor 110 may include one or more processing units. For example, the processor HO may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (neural-network processing unit, NPU). Different processing units may be independent devices, or may be integrated into one or more processors.

The controller may be a nerve center and a command center of the terminal 100. The controller may generate an operation control signal based on instruction operation code and a timing signal, to complete control on instruction fetching and execution.

The processor 110 may further include a memory, configured to store an instruction and data. In some embodiments, the memory in the processor 110 is a cache. The memory may store an instruction or data that has beers used or cyclically used by the processor 110. If the processor 110 needs to use the instruction or the data again, the processor 110 may directly invoke the instruction or the data from the memory. This avoids repeated access and reduces a waiting time of the processor 110, thereby improving efficiency of a system.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, including a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used in audio communication, to sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used in audio communication.

The UART interface is a universal serial data bus, which is used in asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display screen 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal 100. The processor 110 communicates with the display screen 194 through the DSI interface, to implement a display function of the terminal 100.

The GPIO interface may be configured by software. The GPIO interface may be configured as a control signal or a data signal. In some embodiments, the GPIO interface may be configured to connect the processor 110 to the camera 193, the display screen 194, the wireless communications module 160, the audio module 170, the sensor module 180, and the like. The GPIO interface may further be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the terminal 100, or may be configured to transmit data between the terminal 100 and a peripheral device. It may also be configured to connect to a headset, and to play audio by using the headset. The interface may be alternatively configured to connect to another electronic device, such as an AR device.

It may be understood that an interface connection relationship between the modules shown in this embodiment of the present invention is merely an example for description, and does not constitute a limitation on the structure of the terminal 100. In some other embodiments of this application, the terminal 100 may alternatively use an interface connection manner different from that in the embodiment, or a combination of a plurality of interface connection manners.

The charging management module 140 is configured to receive a charging input from the charger. The charger may be a wireless charger or a wired charger. In some embodiments of wired charging, the charging management, module 140 may receive a charging input of the wired charger through the USB interface 130. In some embodiments of wireless charging, the charging management module 140 may receive a wireless charging input by using a wireless charging coil of the terminal 100. The charging management module 140, when charging the battery 142, may further supply power to the electronic device by using the power management module 141.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a timing switch.

The mobile communications module 150 can provide a solution, applied to the terminal 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, the at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal Into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display screen 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the terminal 100, for wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 of the terminal 100 are coupled, and the antenna 2 and the wireless communications module 160 of the terminal 100 are coupled, so that the terminal 100 can communicate with a network and another device by using a wireless communications technology. The wireless communications technology may include, for example, global system for mobile communications (global system tor mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies. The GNSS may include a global positioning system (global positioning system, GPS), a global navigation satellite system (global navigation satellite system, GLONASS), a Beidou navigation satellite system (beidou navigation satellite system, BBS), a quasi-zenith satellite system (quasi-zenith satellite system, QZSS), and/or a satellite-based augmentation system (satellite based augmentation systems, SBAS).

The terminal 100 implements the display function by using the GPU, the display screen 194, the application processor, and the like. The GPU is a microprocessor for image processing, and connects the display screen 194 to the application processor. The GPU is configured to: perform mathematical and geometric calculation, and render an image. The processor 110 may include one or more GPUs, and execute a program instruction to generate or change display information.

The display screen 194 is configured to display an image, a video, and the like. The display screen 194 includes a display panel. The display panel may be made of a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), Minded, MicroLed, Micro-oLed, a quantum dot light-emitting diode (quantum dot light emitting diodes, QLED), or the like. In some embodiments, the terminal 100 may include one or N display screens 194, where N is a positive integer greater than 1.

The terminal 100 can implement the photographing function by using the ISP, the camera 193, the video codec, the GPU, the display screen 194, the application processor, and the like.

The ISP is configured to process data fed back by the camera 193, For example, during photographing, a shutter is opened, a ray of light is transmitted to a light-sensitive element of the camera through a lens, and an optical signal is converted into an electrical signal. The light-sensitive element of the camera transmits the electrical signal to the ISP for processing, and converts the electrical signal into a visible image. The ISP may further optimize an algorithm for noise, luminance, and complexion in an image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the light-sensitive element. The light-sensitive element may be a charge-coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal. In addition to the digital image signal, the digital signal processor may further process another digital signal. For example, when the terminal 100 selects a frequency, the digital signal processor is configured to perform Fourier transform on frequency energy and the like.

The video codec is configured to compress or decompress a digital video. The terminal 100 may support one or more video codecs. In this way, the terminal 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, which quickly processes input information by referring to a structure of a biological neural network, for example, by referring to a transfer mode between human brain neurons, and may further continuously perform self-learning. The NPU can implement applications such as intelligent cognition of the terminal 100, for example, image recognition, facial recognition, speech recognition, and text understanding.

The external memory interface 120 may be configured to connect to an external memory card, for example, a Micro SD card, to extend a storage capability of the terminal 100. The external memory card communicates with the processor 110 through the external memory interface 120, to implement a data storage function. For example, a file such as music or a video is stored in the external memory card.

The internal memory 121 may be configured to store computer-executable program code, and the executable program code includes an instruction. The processor 110 runs the instruction stored in the internal memory 121, to implement various function applications and data processing of the terminal 100. The internal memory 121 may include a program storage area and a data storage area. The program storage area may store an operating system, an application required by at least one function (for example, a sound playing function or an image playing function), and the like. The data storage area may store data (for example, audio data or a phone book) created in a use process of the terminal 100, and the like. In addition, the internal memory 121 may include a high-speed random access memory, and may further include a nonvolatile memory, for example, at least one magnetic disk storage device, a flash storage device, or a universal flash storage (universal flash storage, UFS).

The terminal 100 can implement an audio function by using the audio module 170, the speaker 170A, the receiver 170B, the microphone 170C, the headset jack 170D, the application processor, and the like, for example, music playing or recording.

The audio module 170 is configured to convert digital audio information to an analog audio signal for output, and is also configured to convert an analog audio input to a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal to a sound signal. The terminal 100 may be used to listen to music or answer a call in a hands-free mode over the speaker 170A.

The receiver 170B, also referred to as an "earpiece", is configured to convert an audio electrical signal to a sound signal. When a call is answered or audio information is listened to by using the terminal 100, the receiver 170B may be put close to a human ear to listen to a voice.

The microphone 170C, also referred to as a "MIC" or a "sound transmitter", is configured to convert a sound signal into an electrical signal. When making a call or sending voice information, a user may make a sound by moving the human mouth close to the microphone 170C to input a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, and further identify a sound source, to implement a directional recording function, and the like.

The headset interface 170D is configured to connect to a wired headset. The headset jack 170D may be the USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display screen 194. There are many types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, a capacitance between electrodes changes. The terminal 100 determines pressure intensity based on a change in the capacitance. When a touch operation is performed on the display screen 194, the terminal 100 detects intensity of the touch operation by using the pressure sensor 180A. The terminal 100 may further calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the terminal 100. In some embodiments, an angular velocity of the terminal 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyroscope sensor 180B may further be used in a navigation scenario and a somatic game scenario.

The barometric pressure sensor 180C is configured to measure barometric pressure. In some embodiments, the terminal 100 calculates an altitude by using the barometric pressure measured by the barometric pressure sensor 180C, to assist in positioning and navigation.

The magnetic sensor 180D includes a Hall sensor. The terminal 100 may detect opening and closing of a flip leather case by using the magnetic sensor 180D. In some embodiments, when the terminal 100 is a flip phone, the terminal 100 may detect, based on the magnetic sensor 180D, whether a flip cover is opened or closed, and further set, based on a detected opened or closed state of the leather case or the flip cover, a feature such as automatic unlocking of the flip cover in response to the opened state.

The acceleration sensor 180E may detect magnitude of accelerations in various directions (usually on three axes) of the terminal 100, and may detect magnitude and a direction of the gravity when the terminal 100 is still. It may be further configured to recognize a posture of the electronic device, which is applied to switching between landscape orientation and portrait orientation, a pedometer, or other applications.

The distance sensor 180F is configured to measure a distance. The terminal 100 may measure the distance in an infrared or a laser manner. In some embodiments, in a photographing scenario, the terminal 100 may measure the distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The terminal 100 emits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the user holds the terminal 100 close to an ear to make a call, to automatically turn off the screen for power saving. The optical proximity sensor 180G may also be configured to automatically unlock or lock the screen in a leather case mode or a pocket mode.

The ambient light sensor 180L is configured to sense luminance of ambient light. The terminal 100 may adaptively adjust brightness of the display screen 194 based on the sensed ambient light brightness. The ambient light sensor 180L may also be configured to automatically adjust white balance during photographing. The ambient light sensor 180L may further cooperate with the optical proximity sensor 180G to detect whether the terminal 100 is in a pocket, to avoid an accidental touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor nearby the temperature sensor 180J, to reduce power consumption for thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch panel". The touch sensor 180K may be disposed on the display screen 194. The touch sensor 180K and the display screen 194 form a touchscreen that is also referred to as a "touchscreen". The touch sensor 180K is configured to detect a touch operation on or near the touch sensor 180K. The touch sensor may transfer the detected touch operation to the application processor to determine a type of a touch event. A visual output related to the touch operation may be provided by using the display screen 194. In some other embodiments, the touch sensor 180K may further be disposed on a surface of the terminal 100 at a location different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may further contact a body pulse to receive a blood pressure beating signal. In some embodiments, the bone conduction sensor 180M may also be disposed in the headset, to obtain a bone conduction headset. The audio module 170 may parse out a voice signal based on the vibration signal, obtained by the bone conduction sensor 180M, of the vibrating bone of the vocal-cord part to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or a touch button. The terminal 100 may receive a button input, and generate a button signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display screen 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a Nano SIM card, a Micro SIM card, a SIM card, and the like. A plurality of cards may be inserted into a same SIM card interface 195 at the same time. The plurality of cards may be of a same type or different types. The SIM card interface 195 may further be compatible with different types of SIM cards. The SIM card interface 195 may further be compatible with an external memory card. The terminal 100 interacts with a network by using the SIM card, to implement functions such as conversation and data communication. In some embodiments, the terminal 100 uses an eSIM, namely, an embedded SIM card. The eSIM card may be embedded into the terminal 100, and cannot be separated from the terminal 100.

A software system of the terminal 100 may use a layered architecture, an event-driven architecture, a microkernel architecture, a micro service architecture, or a cloud architecture. In this embodiment of the present invention, an Android system with the layered architecture is used as an example to describe a software structure of the terminal 100.

Figure 2:
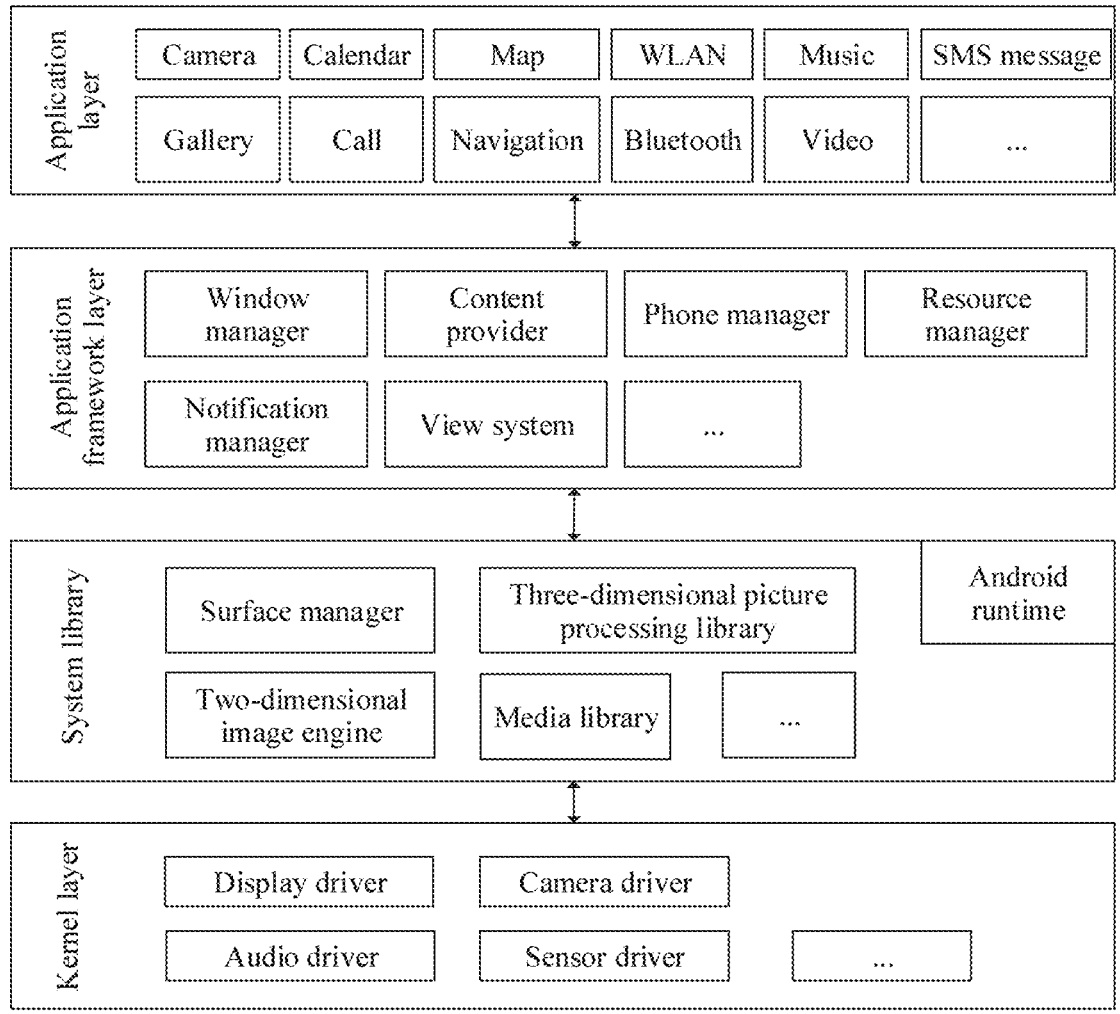
FIG. 2 is a schematic diagram of a software architecture according to an embodiment of this application.

FIG. 2 is a structural block diagram of software of the terminal 100 according to the embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application package may include applications such as "Camera", "Gallery", "Calendar", "Calls", "Maps", "Navigation", "WLAN", "Bluetooth", "Music", "Videos", and "SMS messages".

The application framework layer provides an application programming interface (application programming interface, API) and a programming framework for an application at the application layer. The application framework layer includes some predefined functions.

As shown in FIG. 2, the application program framework layer may include a window manager, a content provider, a view system, a phone manager, a resource manager, a notification manager, and the like.

The window manager is configured to manage a window program. The window manager may obtain a size of the display screen, determine whether there is a status bar, perform screen locking, take a screenshot, and the like.

The content provider is configured to: store and obtain data, and enable the data to be accessed by an application. The data may include a video, an image, audio, calls that are dialed and received, a browsing history and bookmarks, an address book, and the like.

The view system includes visual controls such as a control for displaying a text and a control for displaying an image. The view system may be configured to construct an application. A display interface may include one or more views.

For example, a display interface including a messages notification icon may include a text display view and an image display view.

The phone manager is configured to provide a communication function for the terminal 100, for example, management of a call status (including answering or declining).

The resource manager provides various resources such as a localized character string, an icon, an image, a layout file, and a video file for an application.

The notification manager enables an application to display notification information in a status bar, and may be configured to convey a notification-type message. The notification manager may automatically disappear after a short pause without requiring user interaction. For example, the notification manager is configured to notify download completion, give a message notification, and the like. The notification manager may be a notification that appears in a top status bar of the system in a form of a graph or a scroll bar text, for example, a notification of an application running on the background, or may be a notification that appears on the screen in a form of a dialog window. For example, text information is displayed in the status bar, a prompt tone is played, the electronic device vibrates, or an indicator light blinks.

The Android runtime includes a core library and a virtual machine. The Android runtime is responsible for scheduling and management of the Android system.

The core library includes two parts: a function that needs to be invoked in a java language, and a core library of Android.

The application layer and the application framework layer run on the virtual machine. The virtual machine executes java files of the application layer and the application framework layer as binary files. The virtual machine is configured to implement functions such as object life cycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the terminal 100 with reference to a photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch tap operation, and a control corresponding to the tap operation is a control of a camera application icon is used. A camera application invokes an interface at the application framework layer to enable the camera application, then enables the camera driver by invoking the kernel layer, and captures a static image or a video through the camera 193.

With reference to the accompanying drawings and application scenarios, the following describes in detail an intelligent photographing method provided in an embodiment of this application. In the following embodiment of this application, the terminal may be a terminal 100 shown in FIG. 1 or FIG. 2.

Figure 3A:
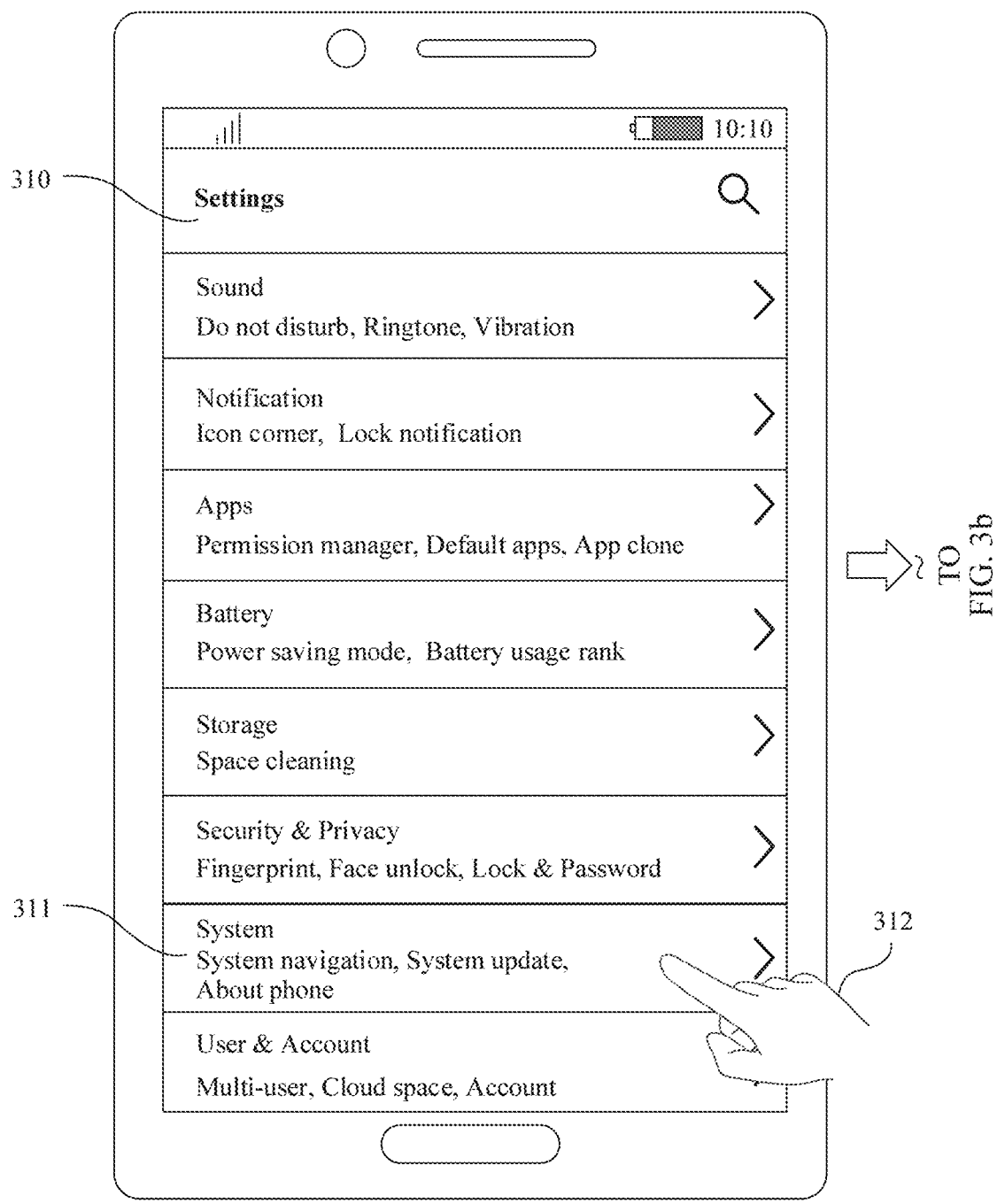
FIG. 3a, FIG. 3b, FIG. 3c, and FIG. 3d are a schematic diagram of a group of interfaces according to an embodiment of this application.

The terminal may receive an input of a user, and enable or disable collection of user data required for an intelligent photographing function in this embodiment of this application. FIG. 3a shows a settings interface 310 displayed on a touch control screen of a terminal. The settings interface 310 may include a system setting bar 311 and other setting bars (for example, a sound setting bar, a notification center setting bar, an application management setting bar, a battery setting bar, a storage setting bar, a security and privacy setting bar, and a user and account setting bar). The terminal may receive an input operation 312 (for example, tapping) performed by the user on the system setting bar 311. In response to the input operation 312 (for example, tapping), the terminal may display a system setting interface 320 shown in FIG. 3b.

Figure 3B:
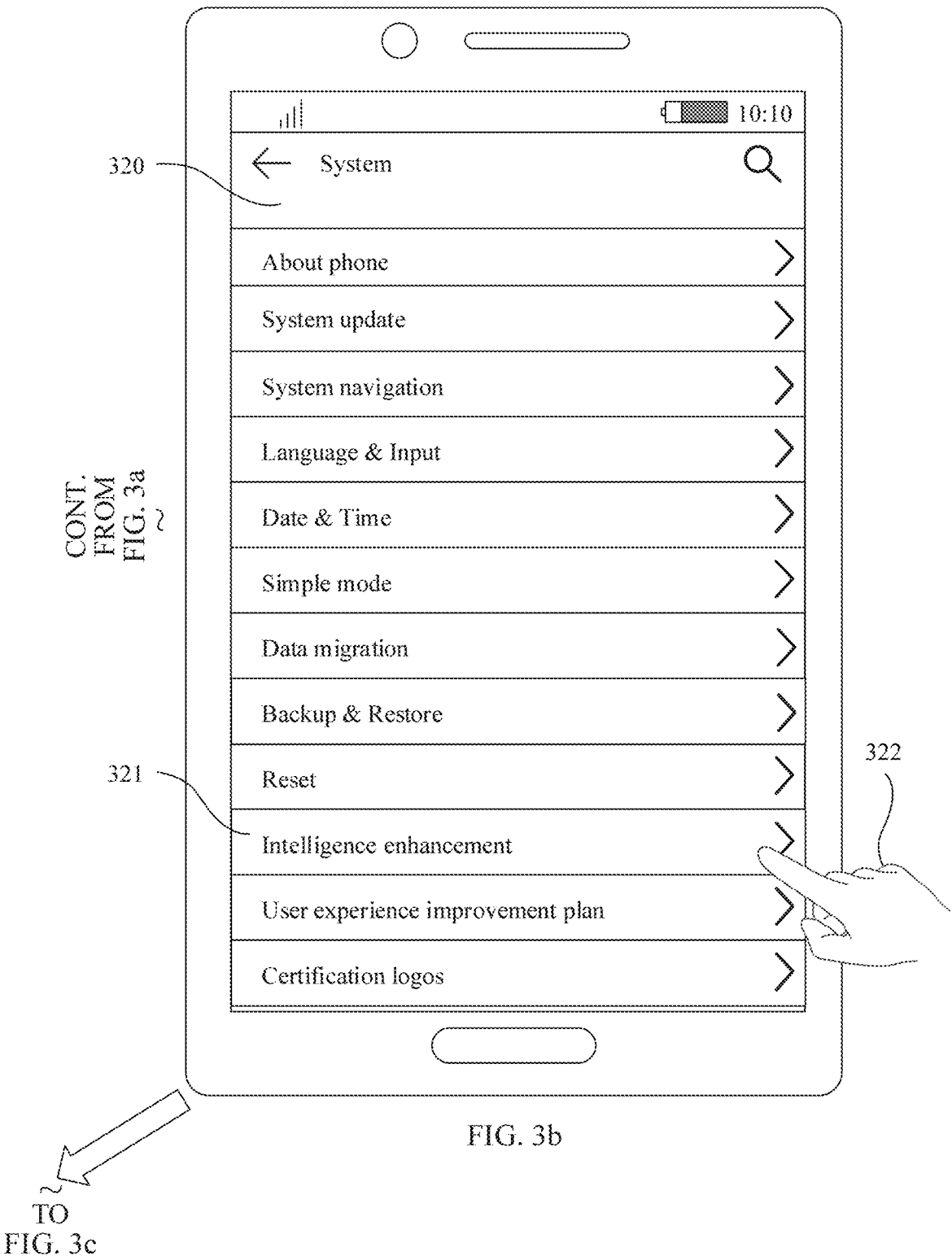

As shown in FIG. 3b, the system setting interface 320 may include an intelligence enhancement setting bar 321 and other setting bars (for example, an about phone setting bar, a system update setting bar, a system navigation setting bar, a language and input method setting bar, a date and time setting bar, a simple mode setting bar, a data migration setting bar, a backup and recovery setting bar, a reset setting bar, a user experience improvement plan setting bar, and a certification mark setting bar). The terminal may receive an input operation 322 (for example, tapping) performed by the user on the intelligence enhancement setting bar 322. In response to the input operation 322 (for example, tapping), the terminal may display an intelligence enhancement setting interface 330 shown in FIG. 3c.

Figure 3C:
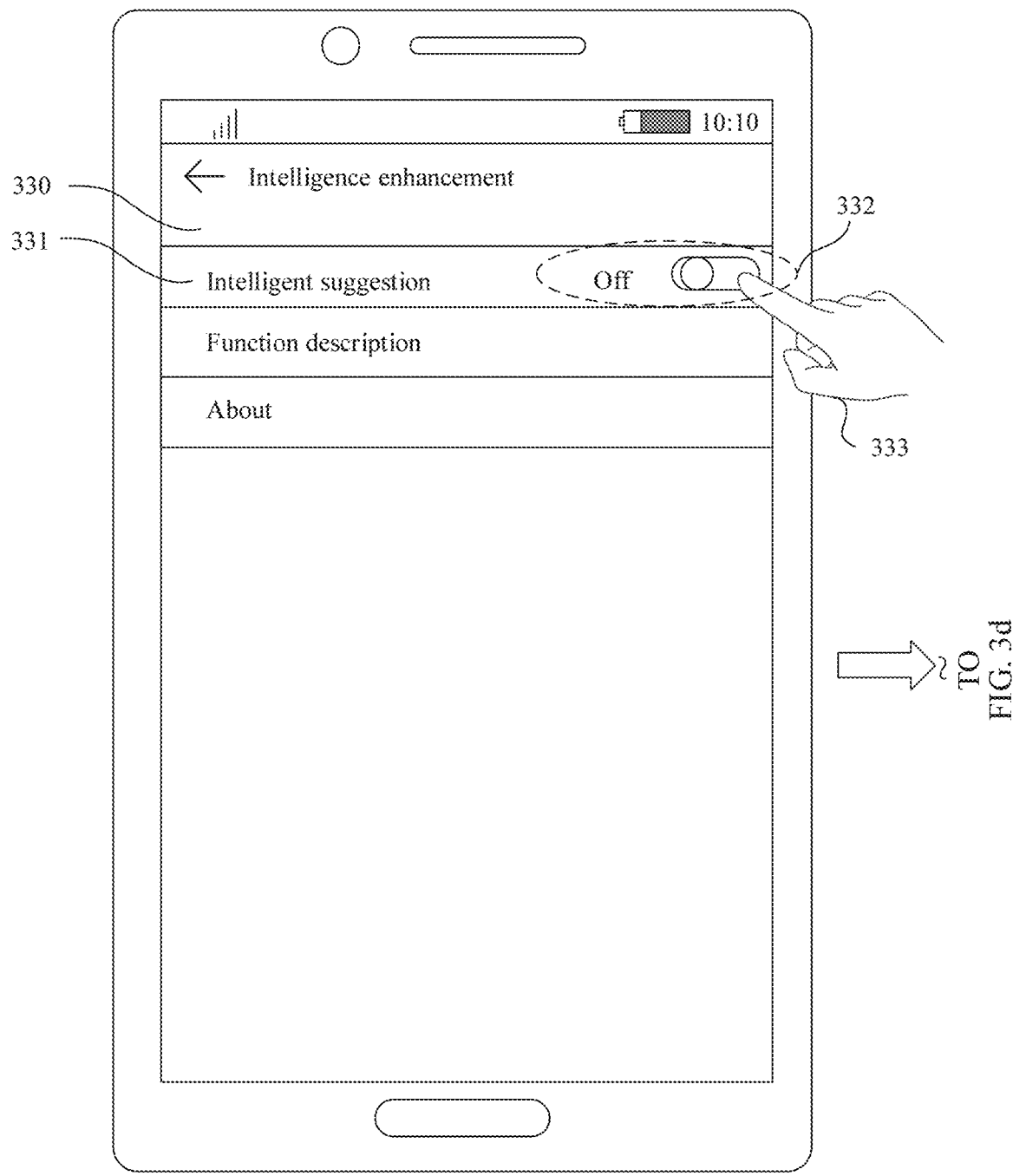
Figure 3D:
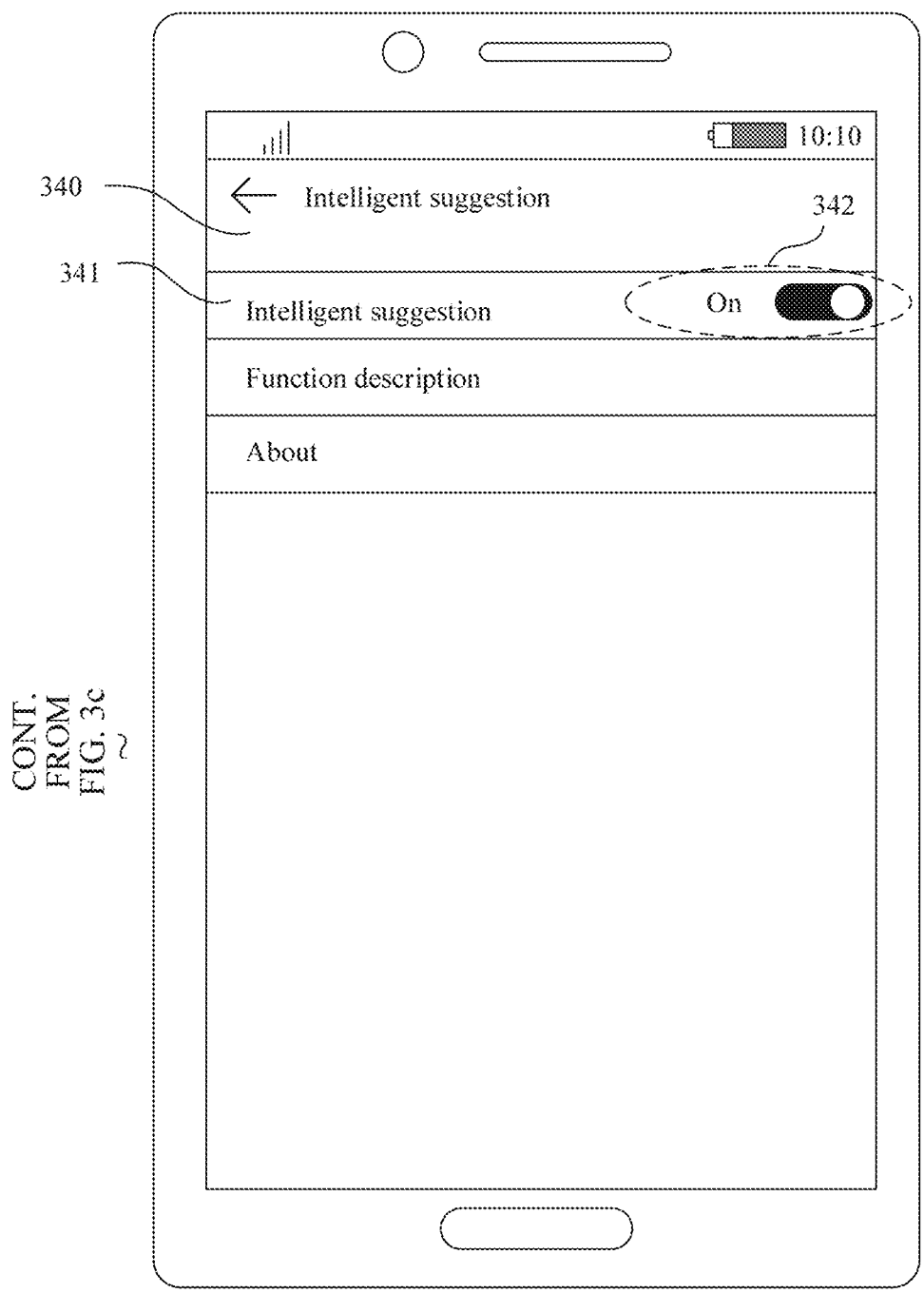

As shown in FIG. 3c, the intelligence enhancement setting interface 330 may include an intelligent suggestion setting bar 331 and other setting bars (for example, "Intelligence enhancement function description" and "About"). The intelligent suggestion setting bar 331 is associated with an intelligent suggestion setting control 332. In FIG. 3c, the intelligent suggestion setting control 332 is in an off state, and the terminal disables the collection of the user data on the terminal. The terminal may receive an input operation 333 (for example, tapping) performed by the user on the intelligent suggestion setting control 332. In response to the input operation 333, the terminal may switch the intelligent suggestion setting control 332 from the off state to an on state, and enable intelligent suggestion. When the intelligent suggestion is enabled, the terminal may collect the user data required for the intelligent photographing function in this embodiment of this application. The user data includes common data and photographing-related data. The common data may include basic personal information, behavior and a habit, an interest and a hobby, and the like of the user. The photographing-related data may include a photographing preference, a picture browsing habit, and the like of the user.

After the terminal collects the user data, the terminal may preprocess the user data. The preprocessed user data may be stored in a database of the user. The database of the user may be in a local terminal, or may be on a remote server.

The terminal may pop up a user preference survey interface in a camera application. The user preference survey interface includes one or more pictures. The terminal may receive a picture selection operation (for example, tapping a picture) performed by the user on the user preference survey interface. In response to the picture selection operation (for example, tapping a picture) performed by the user on the user preference survey interface, the terminal may collect a photographing-related parameter corresponding to a picture selected by the user and a photographing feature tag score vector set corresponding to the picture selected by the user.

Figure 4A:
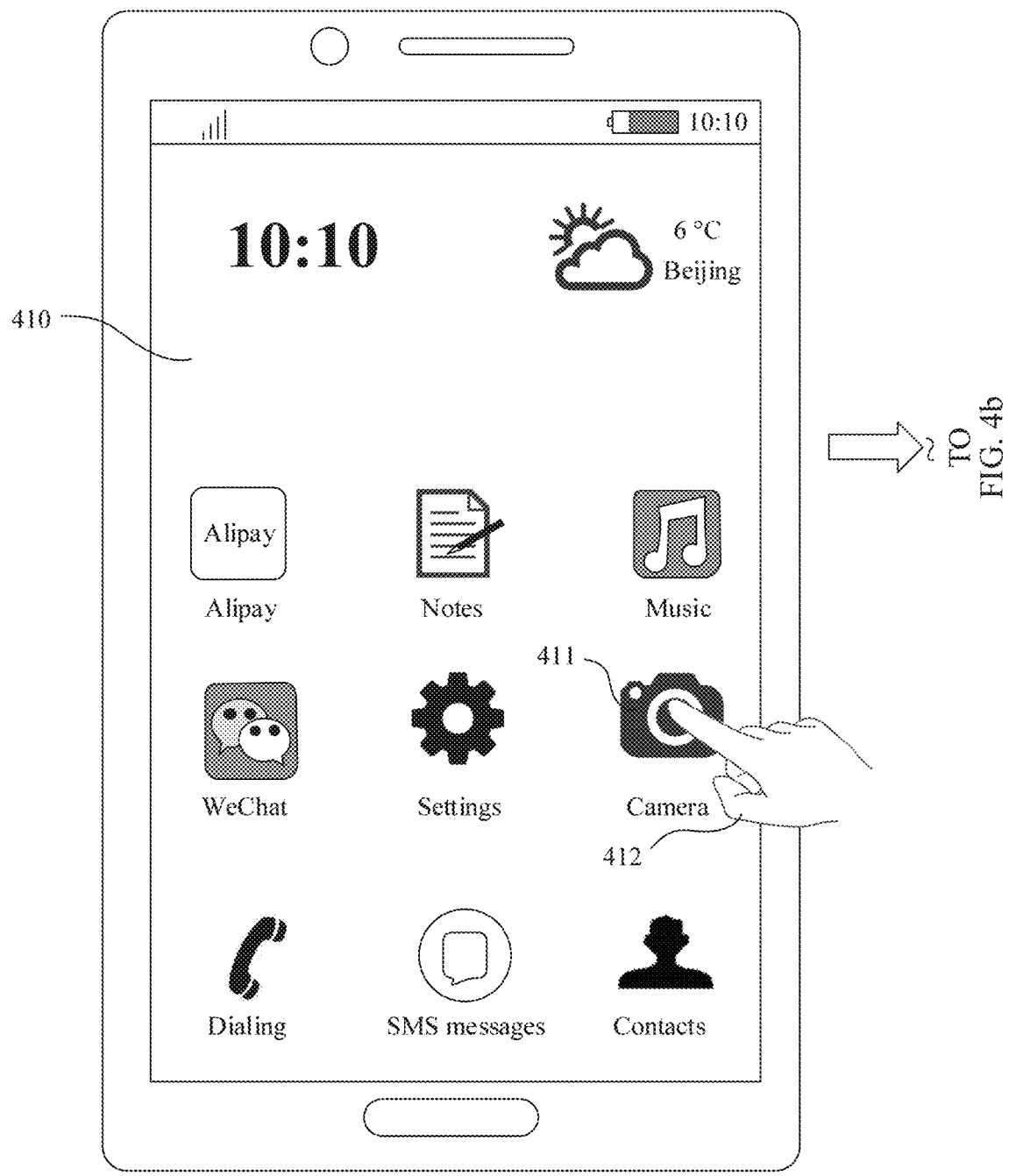
FIG. 4a, FIG. 4b, FIG. 4c, and FIG. 4d are a schematic diagram of another group of interfaces according to an embodiment of this application.

For example, FIG. 4a shows a home screen 410 displayed on a touch control screen of a terminal. The home screen 410 may include an icon 411 of a camera application and icons of other applications (for example, Alipay, Notes. Music, WeChat, Settings, Dialing, SMS messages, and Contacts). The terminal may receive an input operation 412 (for example, tapping) performed by a user on the icon 411 of the camera application. In response to the input operation 412, the terminal may turn on a camera (for example, a front-facing camera or a rear-facing camera), and display, on the touch control screen, a camera photographing interface 420 shown in FIG. 4b.

Figure 4B:
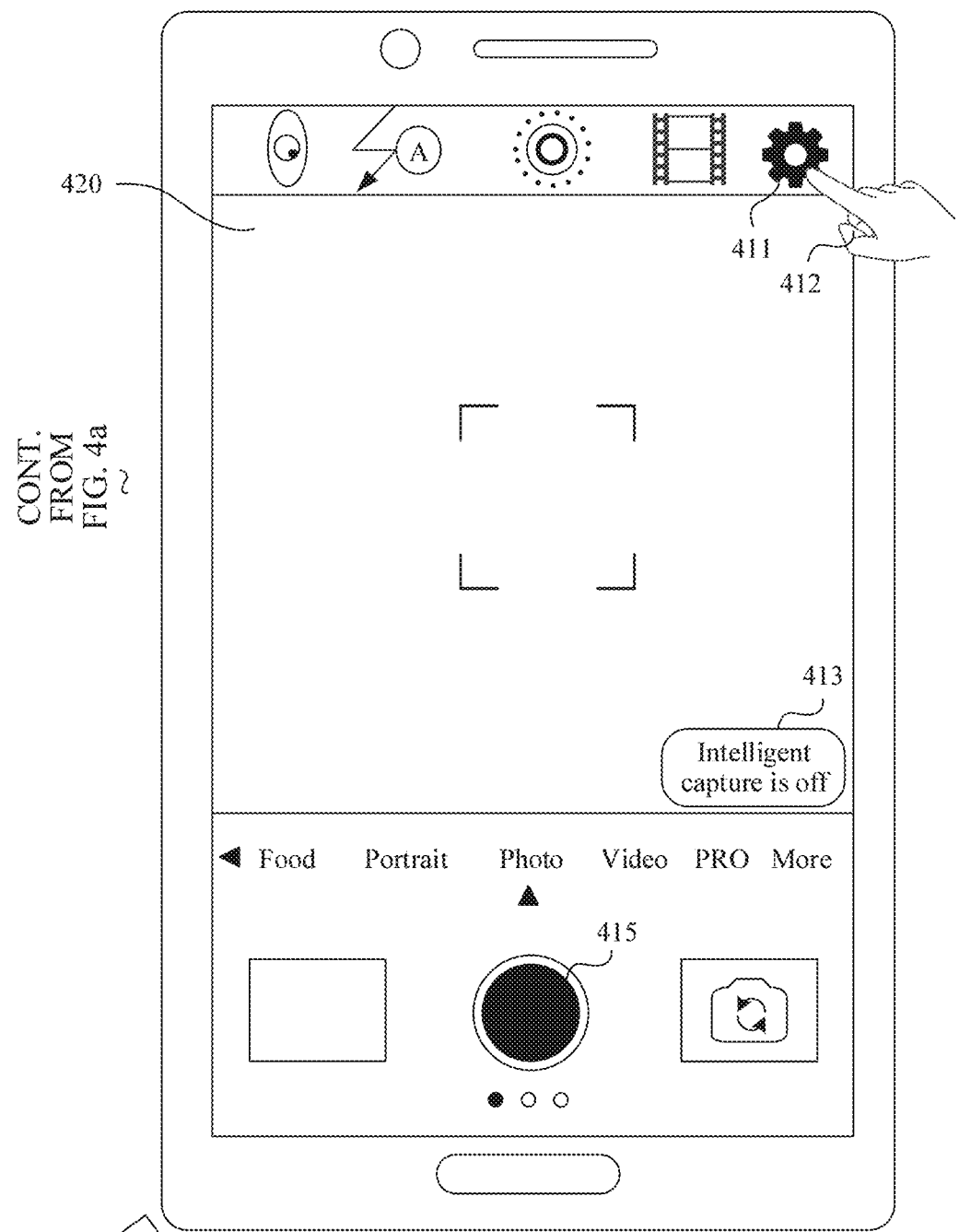

As shown in FIG. 4b, the camera photographing interface 420 may include a camera capture display region 423, a camera setting key 421, a photographing key 425, and the like. The camera capture display region 423 is used to display a picture captured by the camera (the front-facing camera or the rear-facing camera). The terminal may receive an input operation 422 (for example, tapping) performed by the user on the camera setting key 421. In response to the input operation 422, the terminal may display a camera setting interface 430 shown in FIG. 4c.

Figure 4C:
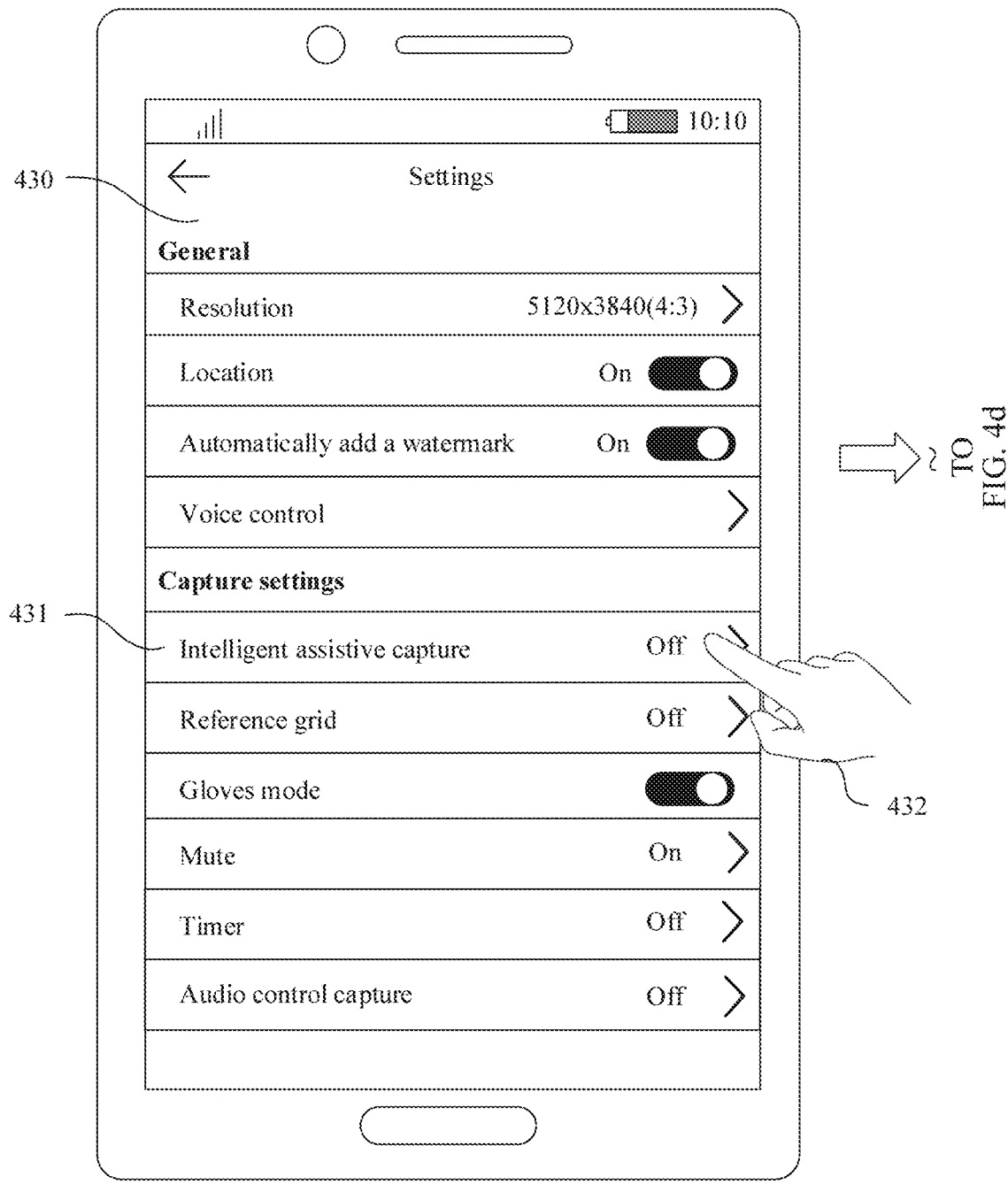

As shown in FIG. 4c, the camera photographing interface 430 may include an intelligent auxiliary photographing setting bar 431 and other setting bars (for example, a resolution setting bar, a geographical location setting bar, an automatically added watermark setting bar, a voice control setting bar, an assistive grid setting bar, a gloves mode setting bar, a photographing mute setting bar, a timing photographing setting bar, and an audio control photographing setting bar). The intelligent auxiliary photographing setting bar 431 is in an off state. In other words, when performing photographing, the terminal disables an intelligent photographing function provided in this embodiment of this application. The terminal may receive an input operation performed by the user on the intelligent auxiliary photographing setting bar 431. In response to the input operation performed by the user on the user auxiliary photographing setting bar, the terminal may enable the intelligent photographing function provided in this embodiment of this application. In a possible case, when the terminal receives an input operation 432 (for example, tapping) performed by the user on the intelligent auxiliary photographing setting bar 431, in response to the input operation 432 (for example, tapping) performed by the user for the first time, the terminal may display a user preference survey interface 440 shown in FIG. 4d.

Figure 4D:
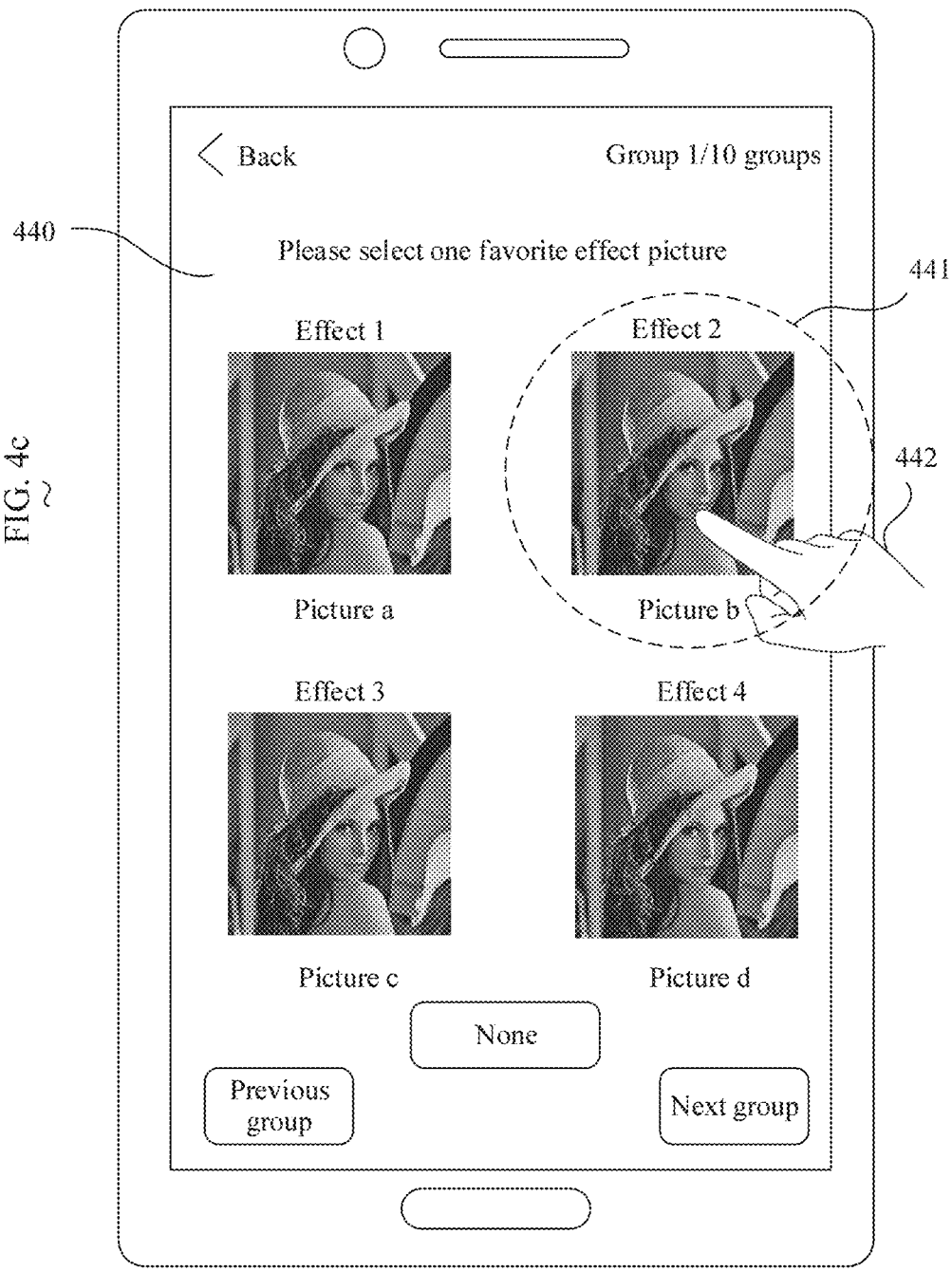

As shown in FIG. 4d, the user preference survey interface 440 may include a plurality of groups (for example, 10 groups) of pictures. Each group of pictures may include a plurality of (for example, four) pictures. Each group of pictures have same picture content. However, photographing-related parameter sets P corresponding to different pictures in each group of pictures are different, and each picture corresponds to a photographing feature tag (for example, Heavy beautification, Light beautification, Freshness, or Japanese style) score vector set S. The photographing-related parameter set P includes a photographing parameter set of a picture and a picture quality (picture quality, PQ) effect parameter set of the picture. The photographing parameter set may be {a1, a2, a3, . . . }. A PQ effect parameter may be {a1, a2, a3 . . . }.

For example, the photographing parameter set may be {White balance (a1), ISO (a2), Exposure compensation (a3), Shutter speed (a4), Focusing mode (a5), Metering mode (a6), Luminance (a7), Saturation (a8), Contrast (a9), Acutance (a10) . . . }. The PQ effect parameter set may be used by the terminal to perform PQ effect adjustment on a picture, for example, picture quality adjustment such as contrast adjustment, luminance adjustment, color saturation adjustment, hue adjustment, definition adjustment (for example, digital noise reduction (digital noise reduction, DNR) adjustment), and color edge enhancement (chroma TI, CTI) adjustment. The foregoing examples are merely used to explain this application and shall not be construed as a limitation.

For example, the photographing feature tag score vector set S may be {a score of Heavy beautification, a score of Light beautification, a score of Freshness, a score of Japanese style}. As shown in FIG. 4d, the user preference interface 440 displays a first group of pictures. The first group of pictures include a picture a, a picture b, a picture c, and a picture d. Photographing-related parameter sets respectively corresponding to the four pictures and photographing feature tag score vector sets S respectively corresponding to the four pictures may be shown in Table 1 below.

TABLE 1

Photographing-related parameter sets and photographing feature tag score vector sets S corresponding to effect pictures

| Effect picture group | Picture number of an effect picture | Photographing-related parameter set P | Photographing feature tag score vector set S |
| --- | --- | --- | --- |
| First group | Picture a | P_a | S_a |
|  | Picture b | P_b | S_b |
|  | Picture c | P_c | S_c |
|  | Picture d | P_d | S_d |

It can be learned from Table 1 that a photographing-related parameter corresponding to the picture a is P_a, and the photographing feature tag score vector set S_a corresponding to the picture a is {0.6, 0, 0.2, 0.2}, which indicates that in the picture a, a score of Heavy beautification is 0.6, a score of Light beautification is 0, a score of Freshness is 0.2, a score of Japanese style is 0.2, and the like. The photographing-related parameter set corresponding to the picture b is P_b, and the photographing feature tag score vector set S_b corresponding to the picture b is {0, 0.2, 0.4, 0.4}, which indicates that in the picture b a score of Heavy beautification is 0, a score of Light beautification is 0.2, a score of Freshness is 0.4, and a score of Japanese style is 0.4. The photographing-related parameter set corresponding to the picture c is P_c, and the photographing feature tag score vector set S_c corresponding to the picture c is {0, 0.2, 0.8, 0}, which indicates that in the picture c, a score of Heavy beautification is 0, a score of Light beautification is 0.2, a score of Freshness is 0.8, and a score of Japanese style is 0. The photographing-related parameter set corresponding to the picture d is P_d, and the photographing feature tag score vector set S_d corresponding to the picture d is {0, 0.2, 0.2, 0.6}, which indicates that in the picture d, a score of Heavy beautification is 0, a score of Light beautification is 0.2, a score of Freshness is 0.2, and a score of Japanese style is 0.6. The foregoing example shown in Table 1 is merely used to explain this application and shall not be construed as a limitation.

A sum of scores of photographing feature tags of the effect picture may be 1. A higher score of a photographing feature tag in the effect picture indicates a higher matching degree between a photographing-related parameter set corresponding to the effect picture and a photographing-related parameter set corresponding to the photographing feature tag. In other words, a photographing feature tag with a higher score better conforms to a feature represented by a photographing-related parameter of the user.

After the terminal receives the effect picture selected by the user, the terminal may record the photographing-related parameter set P (for example, the photographing-related parameter set P_b) corresponding to the effect picture (for example, the picture b) selected by the user, and the photographing feature tag score vector set S (for example, the photographing feature tag score vector set S_b) corresponding to the effect picture selected by the user; use the photographing-related parameter set P (for example, the photographing-related parameter set P_b) and the photographing feature tag score vector set S (for example, the photographing feature tag score vector set S_b) as a training set Q{P→S} (for example, {P_b→S_b}) of a neural network model; and train the neural network model by using a deep learning algorithm, to obtain a mapping function f(x) between the photographing-related parameter set P and the photographing feature tag score vector set S. In the mapping function f(x) of the neural network model, the photographing-related parameter set P is used as an input, and the photographing feature tag score vector set S is used as output. The terminal may input, to the neural network model for training, training parameter sets Q that include photographing-related parameter sets P and photographing feature tag score vector sets S corresponding to a plurality of effect pictures selected by the user, to obtain the mapping function f(x) that better conforms to a preference of the user. For a specific implementation process of the mapping function f(x) for training the neural network model, refer to a neural network training process in the following embodiment shown in FIG. 10. Details are not described herein again.

For example, as shown in FIG. 4d, the terminal may receive an input operation 442 performed by the user on the effect picture (for example, the picture b). In response to the input operation 442, the terminal may use, as a group of training sets Q_1 {P_b→S_b}, the photographing-related parameter set P_b corresponding to the picture b and the photographing feature tag score set S_b corresponding to the picture b; input the training set Q_1 {P_b→S_b} to the neural network model; and train the neural network model by using the deep learning algorithm, to obtain the mapping function f(x).

Figure 5A:
FIG. 5a, and FIG. 5b are a schematic diagram of another group of interfaces according to an embodiment of this application.

In a possible case, the terminal may pop up the user preference survey interface when the terminal receives for the first time an operation of enabling the camera application by the user or receives an operation of enabling the camera application by the user in each user preference survey period (for example, the terminal surveys a photographing preference of the user every 10 days), to collect the photographing-related parameter P corresponding to the picture selected by the user and the photographing feature tag score vector set S corresponding to the picture selected by the user. For example, FIG. 5a shows a home screen 510 displayed on a touch control screen of a terminal. The home screen 510 may include an icon 511 of a camera application and icons of other applications (for example, Alipay, Notes, Music. WeChat, Settings, Dialing. SMS messages, and Contacts). The terminal may receive an input operation 512 (for example, tapping) performed by a user on the icon 511 of the camera application. In response to the input operation 512, the terminal may turn on a camera (for example, a front-facing camera or a rear-facing camera), display, on the touch control screen, a camera photographing interface 520 shown in FIG. 5b, and pop up a user preference survey interface 530 on the camera photographing interface 520.

Figure 5B:
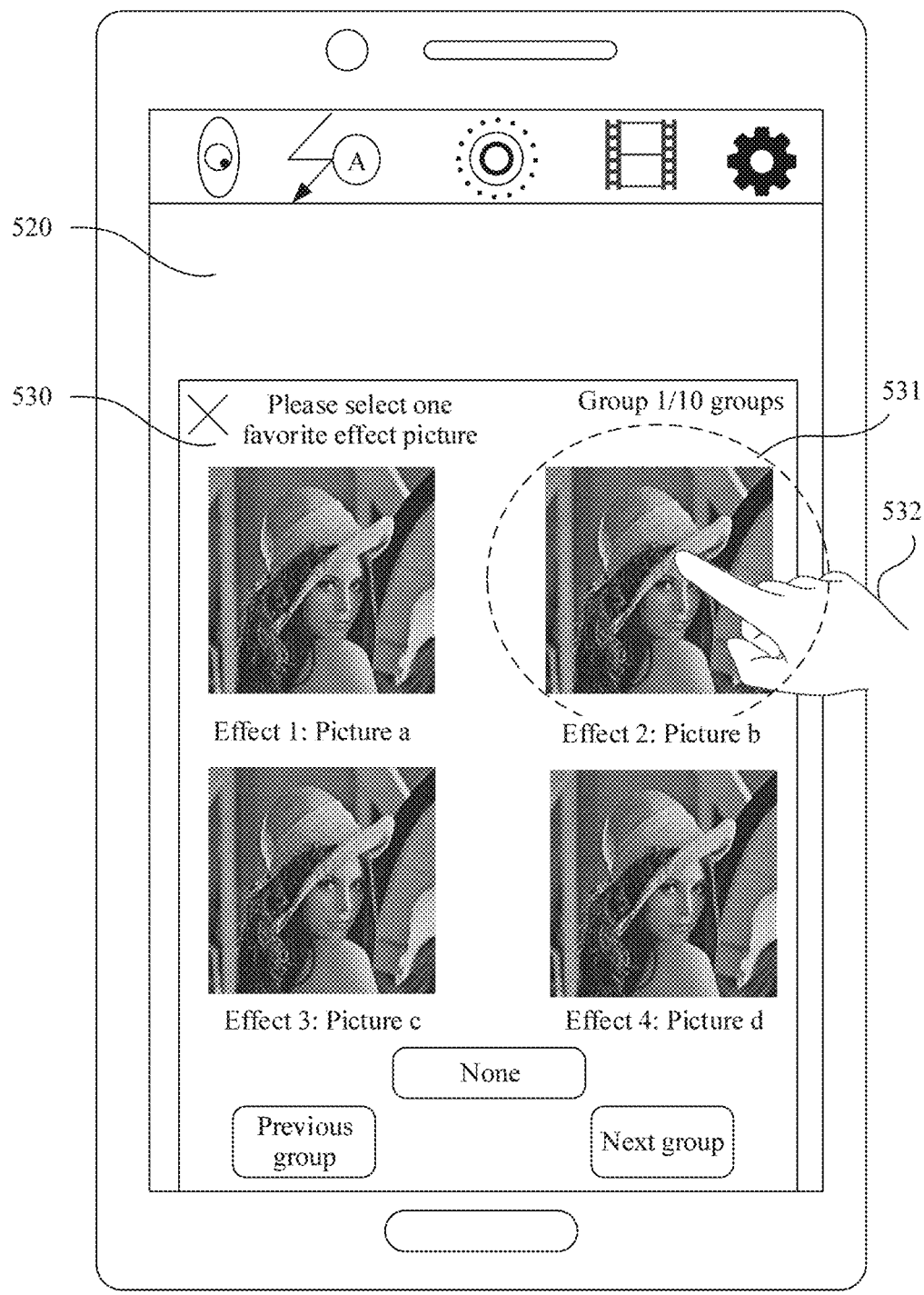

As shown in FIG. 5b, the user preference survey interface 530 may be popped up on the camera photographing interface 520. The user preference survey interface 530 may include a plurality of groups (for example, 10 groups) of pictures. Each group of pictures may include a plurality of (for example, four) pictures. Each group of pictures have same picture content. However, photographing-related parameter sets P corresponding to different pictures in each group of pictures are different, and each picture corresponds to a photographing feature tag (for example, Heavy beautification, Light beautification, Freshness, or Japanese style) score vector set S. The terminal may receive an input operation 532 performed by the user on an effect picture 531 (for example, a picture b). In response to the input operation 532, the terminal may use, as a group of training sets Q_1{P_b→S_b}, a photographing-related parameter set P_b corresponding to the effect picture 531 (for example, the picture b) and a photographing feature tag score set S_b corresponding to the effect picture 531 (for example, the picture b); input the training set Q_1{P_b→S_b} to a neural network; and train the neural network by using a deep learning algorithm, to obtain a mapping function f(x).

After the terminal collects user data (including user common data and a photographing-related parameter of the user), when a quantity of times of training the mapping function f(x) in the neural network by using a training set Q{P→S} is greater than a preset threshold (for example, 10) of the quantity of training times, when the user starts the camera application for photographing, the terminal may perform, by using a PQ effect parameter set corresponding to an intelligent photographing tag (for example, Freshness) matched by the terminal to the user, picture processing on a photo taken by the user, and display the photo on the touch control screen of the terminal. For a process in which the terminal matches the intelligent photographing tag (for example, Freshness) to the user, refer to the following embodiments shown in FIG. 11 and FIG. 12. Details are not described herein.

Figure 6A:
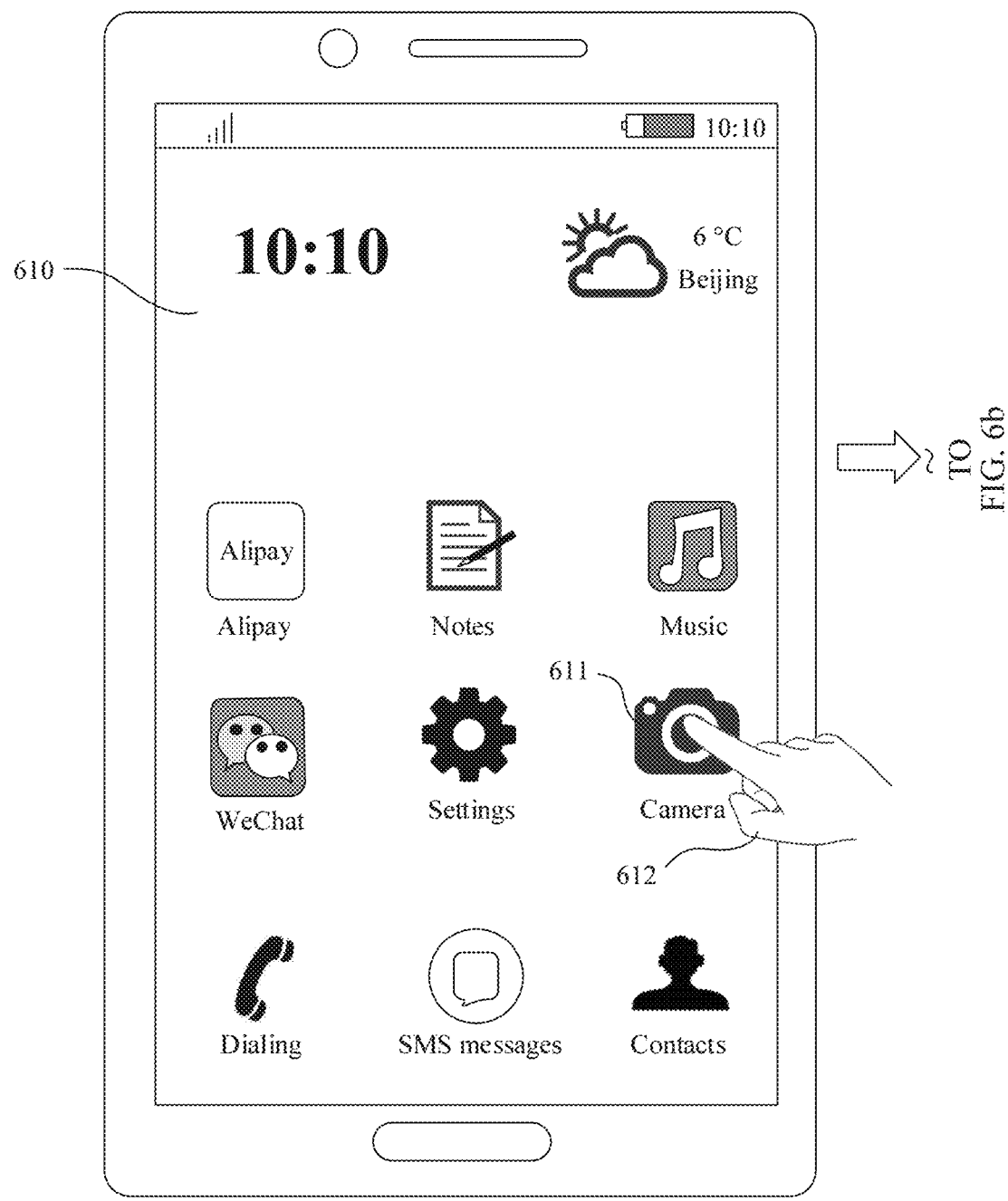
FIG. 6a, FIG. 6b, FIG. 6c, and FIG. 6d is a schematic diagram of another group of interfaces according to an embodiment of this application.

For example, FIG. 6a shows the home screen 510 displayed on a touch control screen of a terminal. The home screen 510 may include an icon 611 of a camera application and icons of other applications (for example, Alipay. Notes, Music, WeChat. Settings, Dialing, SMS messages, and Contacts). The terminal may receive an input operation 612 (for example, tapping) performed by a user on the icon 611 of the camera application. In response to the input operation 612, the terminal may turn on a camera (for example, a front-facing camera or a rear-facing camera), and display, on the touch control screen, a camera photographing interface 620 shown in FIG. 6b.

Figure 6B:
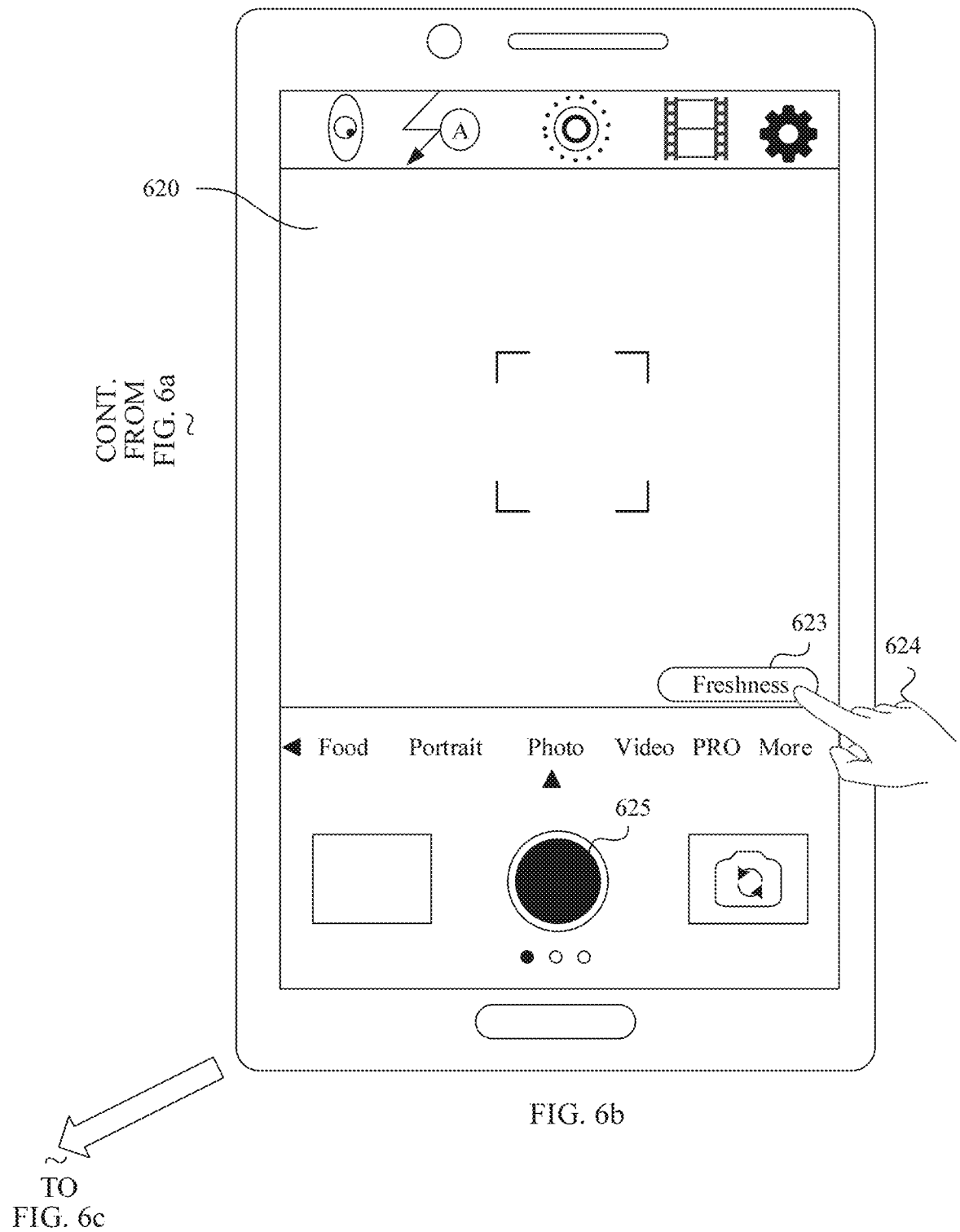

As shown in FIG. 6b, the camera photographing interface 620 may display a picture 621 captured by the camera (for example, the front-facing camera or the rear-facing camera) and a tag recommendation key 623 of an intelligent photographing tag (for example, Freshness) matched by the terminal to the user. The terminal may receive an input operation 624 (for example, tapping) performed by the user on the tag recommendation key 623. In response to the input operation 624 (for example, tapping), the tag recommendation key 623 may be switched from an off state to an on state. The terminal may enable a function of performing picture processing on the picture 621 taken by the terminal, by using a PQ effect parameter set corresponding to the intelligent photographing tag (for example, Freshness). In a possible case, the terminal may receive a re-input operation (for example, tapping) performed by the user on the tag recommendation key 623 in the on state. The tag recommendation key 623 may be switched from the on state to the off state. The terminal may disable the function of performing picture processing on the picture 621 taken by the terminal, by using the PQ effect parameter set corresponding to the intelligent photographing tag (for example, Freshness).

Figure 6C:
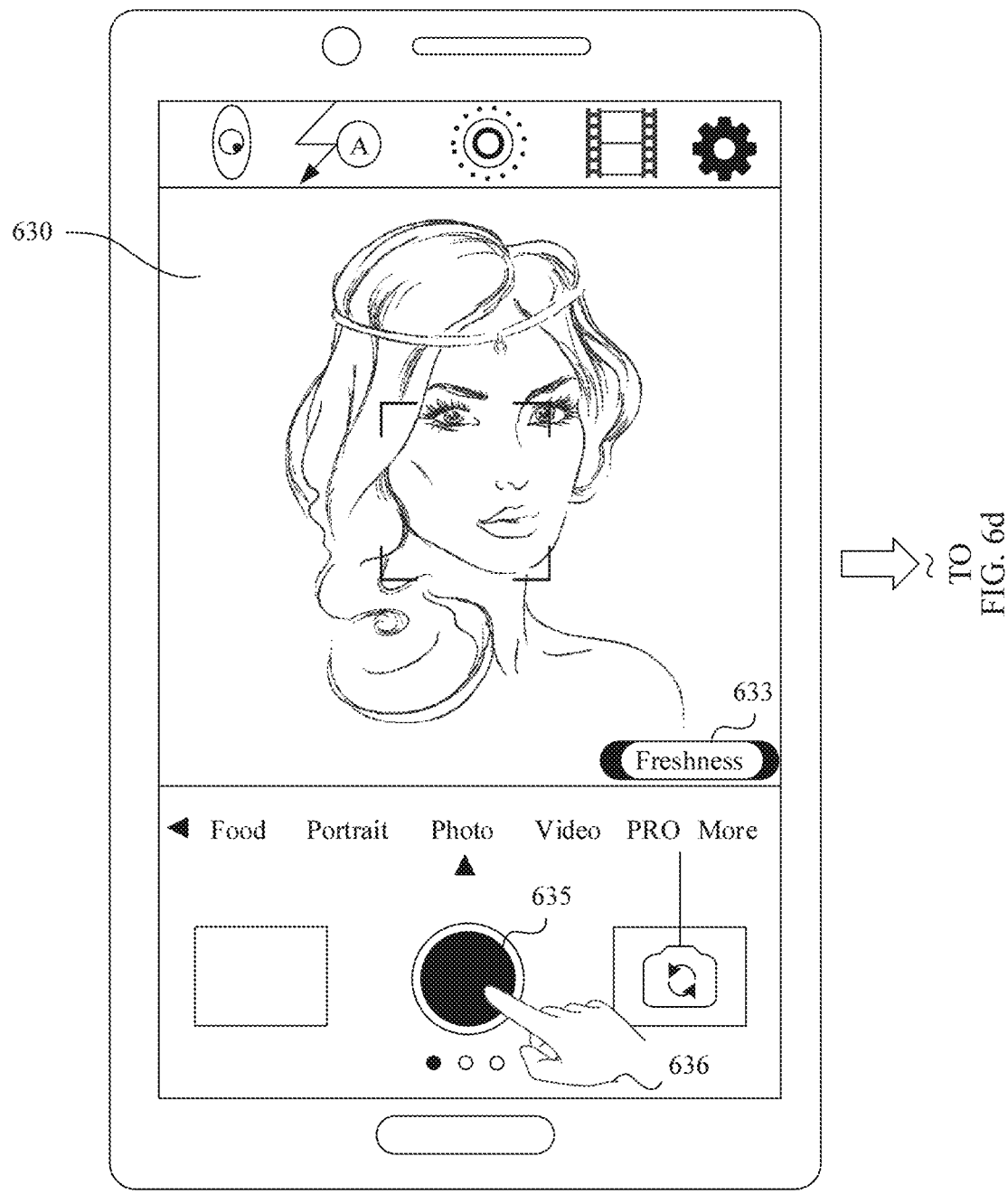
Figure 6D:
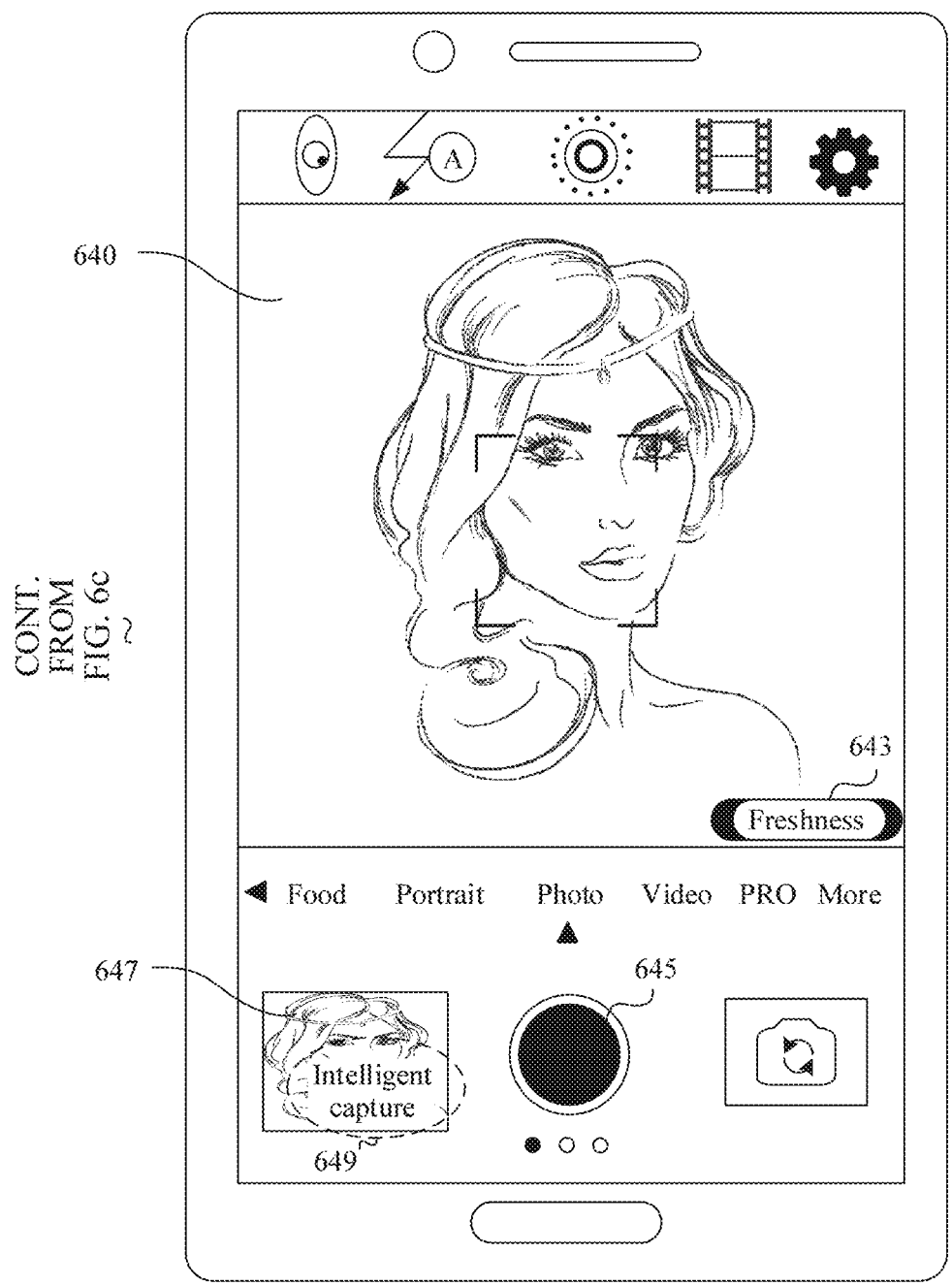

As shown in FIG. 6c, the camera photographing interface 630 may display a picture 631 captured by the camera (for example, the front-facing camera or the rear-facing camera), a tag recommendation key 633 of the intelligent photographing tag (for example, Freshness) matched by the terminal to the user, a photographing key 635, and the like. In FIG. 6c, the tag recommendation key 633 is in an on state. In other words, the terminal may enable a function of performing picture processing on the picture 631 taken by the terminal, by using the PQ effect parameter set corresponding to the intelligent photographing tag (for example, Freshness). The terminal may receive an input operation 636 (for example, tapping) performed by the user on the photographing key 635. In response to the input operation 636 (for example, tapping), the terminal may perform picture processing on the picture 631 taken by the terminal, by using the PQ effect parameter set corresponding to the intelligent photographing tag (for example, Freshness); and store, in a picture library, the picture obtained after the picture processing. The picture obtained after the picture processing may be a picture 647 shown in FIG. 6d. As shown in FIG. 6d, the terminal may annotate an intelligent photographing identifier 649 (for example, intelligent photographing) for the picture 647 obtained after the picture processing, and store, in the picture library, the picture 647 obtained after the picture processing.

The following describes an intelligent photographing system provided in an embodiment of this application.

Figure 7:
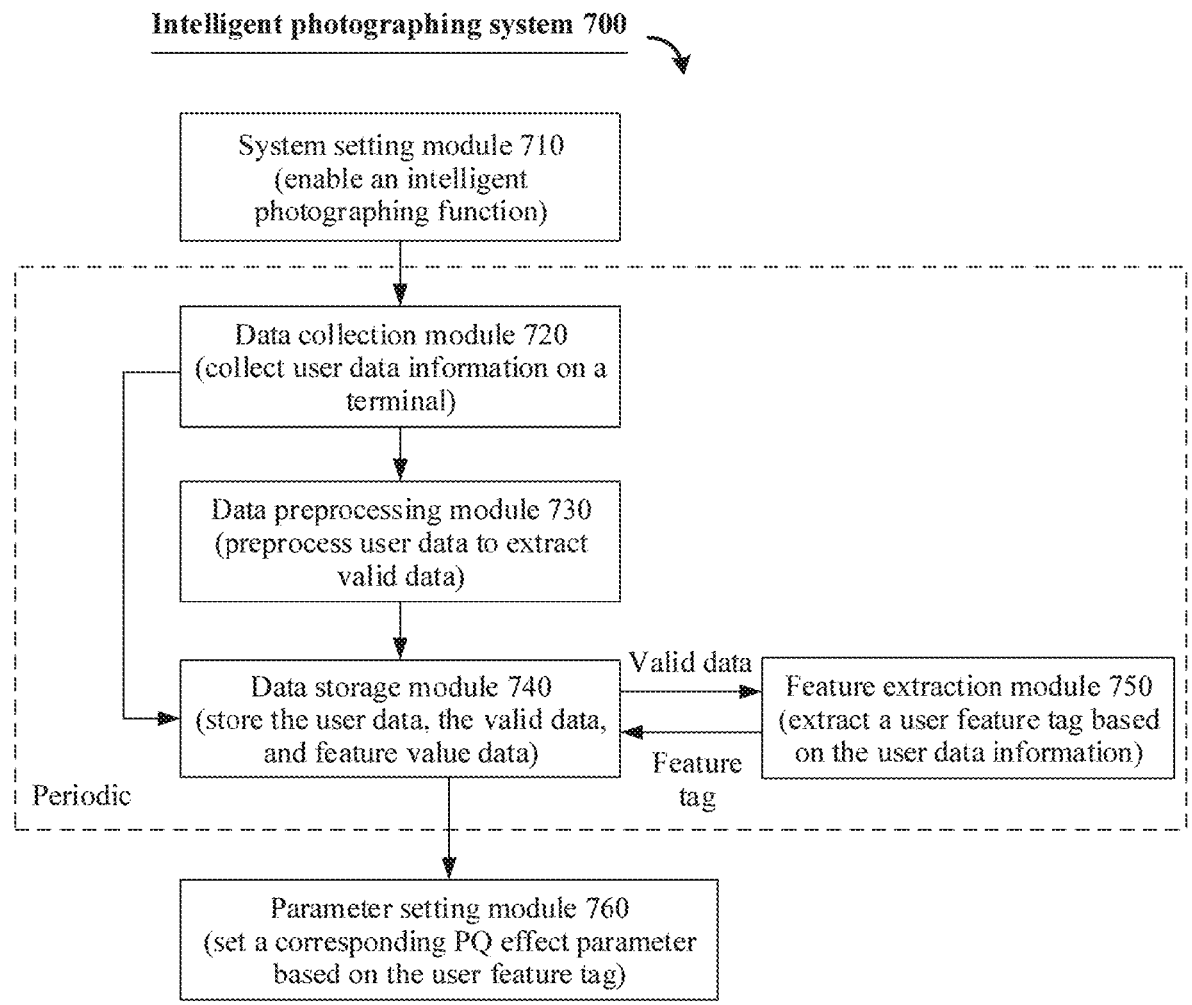
FIG. 7 is a schematic architectural diagram of an intelligent photography system according to an embodiment of this application.

FIG. 7 is a schematic architectural diagram of an intelligent photographing system according to an embodiment of this application. As shown in FIG. 7, the intelligent photographing system 700 may include a system setting module 710, a data collection module 720, a data preprocessing module 730, a data storage module 740, a feature extraction module 750, and a parameter setting module 760.

The system setting module 710 may be configured to enable or disable an intelligent photographing function provided in this embodiment of this application.

The data collection module 720 may be configured to: after the intelligent photographing function is enabled, periodically (for example, a collection period may be 10 days, 15 days, 1 month, or longer) collect data information of a user on a terminal. The data information of the user includes basic personal information (Gender. Year of birth. Habitual residence, and the like), behavior and a habit (a most frequently used APP, an APP with a longest use time, an APP used after a headset is plugged in, a frequently visited place, a bedtime, and a wake-up time), an interest and a hobby (a reading preference and an Internet browsing habit), a photographing preference (a photographing parameter, photographed content, and photographed content), and a picture browsing habit (a shared picture, a deleted picture, a collected picture, and an edited picture).

The data preprocessing module 730 may be configured to preprocess the user data collected by the data collection module 720 to extract valid data. For a preprocessing procedure, refer to the following data preprocessing procedure shown in FIG. 8. Details are not described herein.

The data storage module 740 may be configured to construct a database to store the user data (common data and photographing-related data) collected by the data collection module 720, the valid data (the preprocessed data of the user data) obtained after the data preprocessing module 730 performs processing, and feature value data (a feature value corresponding to a feature tag) obtained after the feature extraction module 750 performs feature extraction.

The feature extraction module 750 may be configured to extract the feature tag of the user based on the user data information collected by the data collection module 720. The feature tag of the user includes a common feature tag, a photographing feature tag, and a fusion feature tag obtained after a feature tag fusion process of the common feature tag and the photographing feature tag. For the feature tag fusion process, refer to the following feature tag fusion process shown in FIG. 11 and FIG. 12. Details are not described herein.

The parameter setting module 760 may be configured to perform, based on a fusion feature tag (that is, an intelligent photographing tag) with a highest score of the user, picture processing on a picture captured by a camera of the terminal; and set, on the picture captured by the camera, a PQ effect parameter corresponding to the fusion feature tag with the highest score.

The following specifically describes a procedure in which the terminal collects the user data in this embodiment of this application.

The terminal may collect the user data in an event tracking manner. To be specific, the terminal may listen to an event in a software application running process, and perform determining and capturing when an event that requires attention occurs. Then, the terminal may obtain related information of the event, sort the related information of the event, and then store, in a local database of the terminal or a remote server, the related information of the event. The event listened to by the terminal may be provided by a platform such as an operating system, a browser, or an application (application, APP) framework; or may be a self-defined trigger event (for example, tapping a specific key) based on a basic event.

For example, the terminal may listen to an event that the user taps a collect key, a delete key, a share key, or the like in a picture library APP. When the terminal receives that the user taps the collect key on a wallpaper picture_1 in a wallpaper APP, the terminal may record the wallpaper picture, use the wallpaper picture_1 as data of a collected picture, and store the wallpaper picture_1 in the terminal locally or the remote server. If the terminal receives that the user taps the delete key on a wallpaper picture_2 in the wallpaper APP, the terminal may record the wallpaper picture, use the wallpaper picture_2 as data of a deleted picture, and store the wallpaper picture_2 in the terminal locally or the remote server. If the terminal receives that the user taps the share key on a wallpaper picture_3 in the wallpaper APP, the terminal may record the wallpaper picture, use the wallpaper picture_3 as data of a deleted picture, and store the wallpaper picture_3 in the terminal locally or the remote server. The foregoing examples are merely used to explain this application and shall not be construed as a limitation.

For example, if the terminal needs to collect statistics about a quantity of times that the user starts an APP and about a time in which the user stays in the APP, the terminal may collect the statistics about the quantity of times that the user starts the APP, by listening to an event that the operating system starts the APP. The quantity of times that the APP is started is incremented by 1 when the terminal successfully starts the APP once. The terminal does not record the quantity of times that the APP is started when the terminal enters the APP again after the user presses a home button to switch to the background. The terminal listens to an input operation of entering the APP by the user and an input operation of exiting the APP by the user, to calculate duration of accessing the APP by the user. The foregoing examples are merely used to explain this application and shall not be construed as a limitation.

In the foregoing event tracking manner, the user data collected by the terminal may include the common data, the photographing-related data, and the like.

The common data may include the basic personal information, the behavior and the habit, the interest and the hobby, and the like of the user. A specific data subtype may be shown in Table 2 below.

TABLE 2

| | Common data | |
|---|---|---|
| Data type | Data subtype | Data attribute |
| Common data | Basic personal information | Gender |
| | | Year of birth |
| | | Habitual residence |
| | Behavior and a habit | Most frequently used APP |
| | | APP with a longest use time |
| | | APP used after a headset is plugged in |
| | | Frequently visited place |
| | | Bedtime |
| | | Wake-up time |
| | Interest and a hobby | Reading preference |
| | | Internet browsing habit |

The following can be learned from Table 2.

1. The basic personal information may include Gender, Year of birth, Habitual residence, and the like.

For example, the terminal may obtain, from personal information of a terminal system account (for example, a Huawei account center of a Huawei terminal or an Apple account center (Apple ID) of an Apple terminal), Gender entered by the user before. In a possible case, the terminal may further perform picture analysis on a plurality of photos taken by a front-facing camera of the user, to deduce Gender of the user. In a possible case, the terminal may further invoke a data access interface with access permission provided by a third-party APP (for example, QQ, WeChat, Taobao, or Weibo), to obtain Gender of the user from a server of the third-party APP. The foregoing manner of obtaining Gender of the user is merely used to explain this application and shall not be construed as a limitation. In specific implementation, Gender of the user may be alternatively obtained in another manner.

For example, the terminal may obtain, from personal information of a system account center of the terminal (for example, a Huawei account center of a Huawei terminal or an Apple account center (Apple ID) of an Apple terminal), Year of birth entered in the personal information under a system account by the user before. In a possible case, the terminal may further invoke a data access interface with access permission provided by a third-party APP (for example, QQ, WeChat, Taobao, or Weibo), to obtain Year of birth of the user from a server of the third-party APP. The foregoing manner of obtaining Year of birth of the user is merely used to explain this application and shall not be construed as a limitation. In specific implementation, Year of birth of the user may be alternatively obtained in another manner.

For example, the terminal may obtain, from personal information of a system account center of the terminal (for example, a Huawei account center of a Huawei terminal or an Apple account center (Apple ID) of an Apple terminal), Habitual residence (for example, a region in personal information in the Huawei account center or a delivery address in personal information in the Apple account (Apple ID) center) entered in the personal information under a system account by the user before. In a possible case, the terminal may further invoke a data access interface with access permission provided by a third-party APP (for example, QQ, WeChat, Taobao, Weibo, and Baidu Map), to obtain Habitual residence of the user from a server of the third-party APP. The foregoing manner of obtaining Habitual residence of the user is merely used to explain this application and shall not be construed as a limitation. In specific implementation, Year of birth of the user may be alternatively obtained in another manner.

2. The behavior and the habit may include a most frequently used APP, an APP with a longest use time, an APP that is used after a headset is plugged in, a frequently visited place, a bedtime, a wake-up time, and the like of the user.

For example, the terminal may record a use record of each APP. The use record of the APP includes a quantity of times that the APP is started in a period (for example, one day, one week, or one month), a time in which the terminal runs the APP in a period (for example, one day, one week, or one month), and an APP used in a period (for example, one day, one week, or one month) after a headset is plugged in the terminal. The terminal may determine, as the most frequently used APP, an APP that is started for a largest quantity of times in a period (for example, one day, one week, or one month). The terminal may determine an APP that runs for a longest time in a period (for example, one day, one week, or one month) as the APP with a longest use time. The terminal may determine, as the APP used after a headset is plugged in, an APP that is used in a period (for example, one day, one week, or one month) for a largest quantity of times after the headset is plugged in the terminal. A manner of obtaining information about the most frequently used APP, the APP with a longest use time, and the APP used after a headset is plugged in is merely used to explain this application and shall not be construed as a limitation. In specific implementation, the most frequently used APP, the APP with a longest use time, and the APP used after a headset is plugged in that are of the user may be alternatively obtained in another manner.

For example, during photographing, the terminal may simultaneously obtain location information, and record a location and a date at which the user takes a picture. Therefore, the terminal may determine the frequently visited place of the user based on the location and the time at which the user takes the picture. The frequently visited place of the user may be a quantity of times that the terminal performs photographing at a same location on different dates. For example, the terminal records that the user takes a picture at the seaside on Jan. 10, 2018, the user takes a picture in the Nanshan District on Feb. 1, 2018, the user takes a picture in a shopping mall on Mar. 1, 2018, the user takes a picture at the seaside on Apr. 2, 2018, and the user takes a picture at the seaside on May 1, 2018. The terminal may determine that the frequently visited place of the user is the "seaside". In a possible case, the terminal may further invoke a data access interface with access permission provided by a third-party APP (for example, Baidu Map or Amap), to obtain the frequently visited place of the user from a server of the third-party APP. The foregoing manner of obtaining the frequently visited place of the user is merely used to explain this application and shall not be construed as a limitation. In specific implementation, the frequently visited place of the user may be alternatively obtained in another manner.

For example, when the terminal is on a bed on which the user sleeps, the terminal may detect vibration information (including a vibration frequency, a vibration amplitude, and the like) and surrounding sound information (a sound amplitude, a sound frequency, and the like) on a surface of the bed by using a plurality of sensors (for example, a motion sensor and a microphone). After the user falls asleep, regular sounds made by the user and breathing of the user or other actions of the user may cause regular movement on the surface of the bed. Therefore, when the terminal determines that the vibration information on the surface of the bed conforms to a bed vibration rule after the user falls asleep, and when the surrounding sound information of the terminal conforms to a sound rule after the user falls asleep, the terminal may determine a bedtime of the user. In a possible case, the terminal may further monitor information such as a heart rate, a breath, a body temperature, a blood pressure, and movement of the user by using an auxiliary device (for example, a smartwatch or a smart band), to obtain the bedtime of the user. The foregoing manner of obtaining the bedtime of the user is merely used to explain this application and shall not be construed as a limitation. In specific implementation, the bedtime of the user may be alternatively obtained in another manner.

For example, the terminal may obtain, by accessing a record in an alarm clock application, an alarm clock time set by the user, to obtain a wake-up time of the user. In a possible case, the terminal may detect, by using a motion sensor, an earliest time at which the user picks up the terminal every day; and determine, as the wake-up time of the user, the earliest time at which the user picks up the terminal. In a possible case, the terminal may monitor an earliest time at which the user unlocks the terminal every day, and determine, as the wake-up time of the user, the time at which the user unlocks the terminal. The foregoing manner of obtaining the wake-up time of the user is merely used to explain this application and shall not be construed as a limitation. In specific implementation, the wake-up time of the user may be alternatively obtained in another manner.

3. The interest and the hobby may include a reading preference, an Internet browsing habit, and the like.

For example, the terminal may obtain the reading preference of the user by using a reading application (for example, Huawei Reader on a Huawei terminal) on the terminal. In a possible case, the terminal may further invoke a data access interface with access permission provided by a third-party APP (for example, WeChat Reader or QQ Reader), to obtain the frequently visited place of the user from a server of the third-party APP. The foregoing manner of obtaining the reading preference of the user is merely used to explain this application and shall not be construed as a limitation. In specific implementation, the frequently visited place of the user may be alternatively obtained in another manner.

For example, the terminal may receive an input operation of opening a browser by the user (for example, tapping an icon of a browser application on the home screen of the terminal, or entering "open the browser" by using a voice assistant). In response to the input operation of opening the browser by the user, the terminal may display a search page of the browser, and the terminal may record search content entered by the user on the search page of the browser, and extract a keyword (for example, a "scenic spot") of the search content within a period of time (for example, one day, one week, or one month). The terminal may further record an accessed network address of the user, and extract a type of the accessed network address of the user (for example, a video website, a travel website, or a shopping website). Herein, the Internet browsing habit of the user may include information such as a search keyword of the user and an accessed network address type. In specific implementation, the Internet browsing habit of the user may further include other information. In a possible case, the terminal may further invoke a data access interface with access permission provided by a third-party APP (for example, Weibo or Baidu), to obtain the Internet browsing habit of the user from a server of the third-party APP. The foregoing manner of obtaining the Internet browsing habit of the user is merely used to explain this application and shall not be construed as a limitation. In specific implementation, the Internet browsing habit of the user may be alternatively obtained in another manner.

The photographing-related data may include a photographing preference, a picture browsing habit, and the like of the user. A specific data type may be shown in Table 3 below.

TABLE 3

Photographing-related data

| Data type | Subtype | Data attribute |
| --- | --- | --- |
| Photographing preference | Photographing parameter | White balance<br>ISO<br>Exposure compensation<br>Shutter speed<br>Focusing mode<br>Metering mode<br>Luminance<br>Saturation<br>Contrast<br>Acutance |
| | Photographing mode | Common photographing<br>Aperture<br>Portrait mode<br>Food mode<br>Monochrome camera<br>Professional photographing<br>3D dynamic panorama<br>HDR photographing<br>. . . |
| | Photographed content | Portrait<br>Plant<br>Flower<br>Food<br>Sunrise<br>Sunset<br>. . . |

TABLE 3-continued

Photographing-related data

| Data type | Subtype | Data attribute |
|---|---|---|
| Picture browsing habit | Share | Picture |
| | Delete | Picture |
| | Collect | Picture |
| | Edit | Picture |

It can be learned from Table 3 that Photographing preference includes the photographing parameter, the photographing mode, the photographed content, and the like. The picture browsing habit includes a shared picture, a deleted picture, a collected picture, an edited picture, and the like.

1. The photographing parameter may include White balance, ISO (international standards organization, ISO), Exposure compensation, Shutter speed, Focusing mode, Metering mode, Luminance, Saturation, Contrast, Acutance, and the like.

For example, the terminal may receive an input operation of enabling a camera application by the user (for example, tapping an icon of the camera application on the home screen of the terminal, or entering "start a camera" by using the voice assistant). In response to the input operation of enabling the camera, the terminal may start the camera and display, on the touch control screen, a picture captured by the camera. When the terminal receives an input operation of setting the photographing parameter by the user, in response to the input operation of setting the photographing parameter by the user, the terminal may record and collect the photographing parameter set by the user. For example, the terminal may perform picture analysis on the shared picture, the deleted picture, the collected picture, and the edited picture of the user, to extract the photographing parameter from the pictures. The foregoing manner of obtaining the photographing parameter of the user is merely used to explain this application and shall not be construed as a limitation. In specific implementation, the photographing parameter of the user may be alternatively obtained in another manner.

For example, the photographing parameter that is of the user and that is obtained by the terminal may be shown in Table 4 below.

TABLE 4

Photographing parameter of a user

| Photographing parameter | Data value |
|---|---|
| White balance | 2400K |
| ISO | 100 |
| Exposure compensation | +0.5 EV |
| Shutter speed | 1/125 s |
| Focusing mode | AF |
| Metering mode | Center-weighted metering |
| Luminance | 10 EV |
| Saturation | 120 |
| Contrast | 100 |
| Acutance | MTF 50 |

It can be learned, from the photographing parameter of the user shown in Table 4, that the photographing parameter of the user is as follows: a value of White balance is 2400 K, a value of ISO (international standards organization, ISO) is 100, a value of Exposure compensation is +0.5 EV, a value of Shutter speed is $\frac{1}{125}$s, Focusing mode is auto focus (auto focus, AF), Metering mode is center-weighted metering, a value of Luminance is an exposure value (exposure value, EV) of 10, a value of Saturation is 120, a value of Contrast is 100, and a value of Acutance is MTF 50. The foregoing Table 4 is merely used to explain this application and shall not be construed as a limitation.

2. The photographing mode may include a common photographing mode, an aperture mode, a portrait mode, a food mode, a monochrome camera mode, a professional photographing mode, a 3D dynamic panorama mode, a high dynamic range imaging (high dynamic range imaging, HDR) photographing mode, and the like.

Each photographing mode may correspond to a group of photographing-related parameter sets. The photographing-related parameter set may include a photographing parameter set {a1, a2, a3, . . . } and a picture quality (picture quality, PQ) effect parameter {b1, b2, b3, . . . }. The PQ effect parameter set may be used by the terminal to perform PQ effect adjustment on a picture, for example, picture quality adjustment such as contrast adjustment, luminance adjustment, color saturation adjustment, hue adjustment, definition adjustment (for example, digital noise reduction (digital noise reduction, DNR) adjustment), and color edge enhancement (chroma TI, CTI) adjustment.

For example, a correspondence between a photographing mode and a photographing-related parameter set may be shown in Table 5 below.

TABLE 5

Correspondence between a photographing mode and a photographing-related parameter set

| Photographing mode | Photographing-related parameter set |
|---|---|
| Common | P_1 |
| Aperture | P_2 |
| Portrait | P_3 |
| Food | P_4 |
| Monochrome camera | P_5 |
| Professional | P_6 |
| 3D dynamic panorama | P_7 |
| HDR | P_8 |
| . . . | . . . |

It can be learned from the correspondence shown in Table 5 between a photographing mode and a photographing-related parameter set that a photographing-related parameter set corresponding to the common photographing mode in the photographing mode is P_1, a photographing-related parameter set corresponding to the aperture photographing mode is P_2, a photographing-related parameter set corresponding to the portrait photographing mode is P_3, a photographing-related parameter set corresponding to the food photographing mode is P_4, a photographing-related parameter set corresponding to the monochrome camera photographing mode is P_5, a photographing-related parameter set corresponding to the professional photographing mode is P_6, a photographing-related parameter set corresponding to the 3D dynamic panorama mode is P_7, and a photographing-related parameter set corresponding to the HDR photographing mode is P_8. The foregoing Table 5 is merely used to explain this application and shall not be construed as a limitation.

The terminal may record a photographing mode used by the user each time the user takes a picture. Therefore, according to the preset correspondence between a photographing mode and a photographing-related parameter set P, the terminal may determine, as a frequently used photographing mode of the user, a photographing mode that is used by the user for a quantity of times that is greater than a preset quantity threshold (for example, the preset quantity threshold may be 1, 2, 3, 4, 5, or 10).

For example, the photographing-related parameter set corresponding to the frequently used photographing mode that is of the user and that is obtained by the terminal may be shown in Table 6 below.

TABLE 6

Correspondence between a frequently used photographing mode of a user and a photographing-related parameter set

| Frequently used photographing mode of a user | Photographing-related parameter set |
|---|---|
| Common | P_1 |
| Aperture | P_2 |
| Portrait | P_3 |
| Food | P_4 |
| HDR | P_8 |

It can be learned, from the frequently used photographing mode of the user and the corresponding photographing-related parameter set that are shown in Table 6, that the frequently used photographing mode and the corresponding photographing-related parameter set that are obtained by the terminal are respectively a common photographing mode and a photographing-related parameter set P_1 corresponding to the common photographing mode, an aperture mode and a photographing-related parameter set P_2 corresponding to the aperture mode, a portrait mode and a photographing-related parameter set P_3 corresponding to the portrait mode, a food mode and a photographing-related parameter set P_4 corresponding to the food mode, and an HDR photographing mode and a photographing-related parameter set P_8 corresponding to the HDR photographing mode. The foregoing examples shown in Table 6 are merely used to explain this application and shall not be construed as a limitation.

3. The photographed content may include: a portrait, a plant, a flower, a food, a sunrise, a sunset, and the like.

Each photographing mode may correspond to a group of photographing-related parameter sets. The photographing-related parameter set includes a photographing parameter set and a PQ effect parameter set. The PQ effect parameter set may be used by the terminal to perform PQ effect adjustment on a picture, for example, picture quality adjustment such as contrast adjustment, luminance adjustment, color saturation adjustment, hue adjustment, definition adjustment (for example, digital noise reduction (digital noise reduction, DNR) adjustment), and color edge enhancement (chroma TI, CTI).

For example, a correspondence between photographed content and a photographing-related parameter set may be shown in Table 7 below.

TABLE 7

Correspondence between photographed content and a photographing-related parameter set

| Photographed content | Photographing-related parameter set |
|---|---|
| Portrait | P_9 |
| Plant | P_10 |
| Flower | P_11 |
| Food | P_12 |

TABLE 7-continued

Correspondence between photographed content and a photographing-related parameter set

| Photographed content | Photographing-related parameter set |
|---|---|
| Sunrise | P_13 |
| Sunset | P_14 |
| . . . | . . . |

It can be learned, from the correspondence that is between a photographing mode and a photographing-related parameter set and that is shown in Table 7, that a photographing-related parameter set corresponding to photographed portrait content is P_9, a photographing-related parameter set corresponding to photographed plant content is P_10, a photographing-related parameter set corresponding to photographed flower content is P_11, a photographing-related parameter set corresponding to photographed food content is P_12, a photographing-related parameter set corresponding to photographed sunrise content is P_13, and a photographing-related parameter set corresponding to photographed sunset content is P_14. Table 7 is merely used to explain this application and shall not be construed as a limitation.

The terminal may record photographed content recognized by the terminal through the camera each time the user takes a picture. Therefore, according to the preset correspondence between photographed content and a photographing-related parameter set P, the terminal may determine, as frequently photographed content of the user, photographed content that is recognized by the terminal through the camera for a quantity of times that is greater than a second threshold (for example, the second threshold may be 1, 2, 3, 4, 5, or 10) when the user takes a picture.

For example, the frequently photographed content of the user and the photographing-related parameter set corresponding to the photographed content that are obtained by the terminal may be shown in Table 8 below.

TABLE 8

Frequently photographed content of a user and a corresponding photographing-related parameter set

| Frequently photographed content of a user | Photographing-related parameter set |
|---|---|
| Portrait | P_9 |
| Food | P_12 |
| Sunrise | P_13 |
| Sunset | P_14 |

It can be learned, from the frequently photographed content of the user and the corresponding photographing-related parameter set that are shown in Table 8, that the frequently photographed content of the user and the corresponding photographing-related parameter set that are obtained by the terminal are photographed portrait content and a photographing-related parameter set P_9 corresponding to the photographed portrait content, photographed food content and a photographing-related parameter set P_12 corresponding to the photographed food content, photographed sunrise content and a photographing-related parameter set P_13 corresponding to the photographed sunrise content, and photographed sunset content and a photographing-related parameter set P_14 corresponding to the photographed sunset content. The foregoing example shown in Table 8 is merely used to explain this application and shall not be construed as a limitation.

4. The picture browsing habit may include a shared picture, a deleted picture, a collected picture, an edited picture, and the like.

For example, the terminal may receive an input operation of opening a photo album by the user (for example, tapping an icon of a photo album application on the home screen of the terminal, or entering "open the photo album" by using the voice assistant). In response to the input operation of opening the photo album, the terminal may start the photo album application and display a photo album application interface on the touch control screen. The photo album application interface may include one or more photos. The terminal may receive a sharing operation, a deleting operation, a collecting operation, an editing operation, or the like that are performed by the user on a photo in the photo album application. When the terminal receives the sharing operation performed by the user on a photo selected by the user, the terminal may obtain, through picture analysis, a photographing-related parameter set corresponding to the photo shared by the user. When the terminal receives the deleting operation performed by the user on a photo selected by the user, the terminal may obtain, through picture analysis, a photographing-related parameter set corresponding to the photo deleted by the user. When the terminal receives the collecting operation performed by the user on a photo selected by the user, the terminal may obtain, through picture analysis, a photographing-related parameter set corresponding to the photo collected by the user. When the terminal receives the editing operation performed by the user on a photo selected by the user, the terminal may obtain, through picture analysis, a photographing-related parameter set corresponding to the photo edited by the user.

The shared picture, the deleted picture, the collected picture, and the edited picture that are of the user and that are obtained by the terminal, and the photographing-related parameter sets respectively corresponding to these pictures may be shown in Table 9 below.

TABLE 9

Picture browsing habit of a user and a photographing-related parameter set corresponding to a picture

| Picture browsing habit | Picture | Photographing-related parameter set |
|---|---|---|
| Share | Picture_A | P_15 |
| | Picture_B | P_16 |
| Delete | Picture_C | P_17 |
| | Picture_D | P_18 |
| Collect | Picture_E | P_19 |
| | Picture_F | P_20 |
| Edit | Picture_G | P_21 |
| | Picture_H | P_22 |

It can be learned, from the picture browsing habit of the user and a PQ effect parameter corresponding to a picture that are shown in Table 9, that the shared picture of the user includes the picture_A and the picture_B, the photographing-related parameter set corresponding to the picture_A is P_15, and the photographing-related parameter set corresponding to the picture_B is P_16. The deleted picture of the user includes the picture_C and the picture_D, the photographing-related parameter set corresponding to the picture_C is P_17, and the photographing-related parameter set corresponding to the picture_D is P_18. The collected picture of the user includes the picture_E and the picture_F, the photographing-related parameter set corresponding to the picture_E is P_19, and the photographing-related parameter set corresponding to the picture_F is P_20. The edited picture of the user includes the picture_G and the picture_H, the photographing-related parameter set corresponding to the picture_G is P_21, and the photographing-related parameter set corresponding to the picture_H is P_22. Table 9 is merely used to explain this application and shall not be construed as a limitation.

The following specifically describes a procedure in which the terminal preprocesses the collected user data in this embodiment of this application.

After the terminal collects the user data, the terminal may preprocess the collected user data to extract valid source data and store the valid source data in a database.

Figure 8:
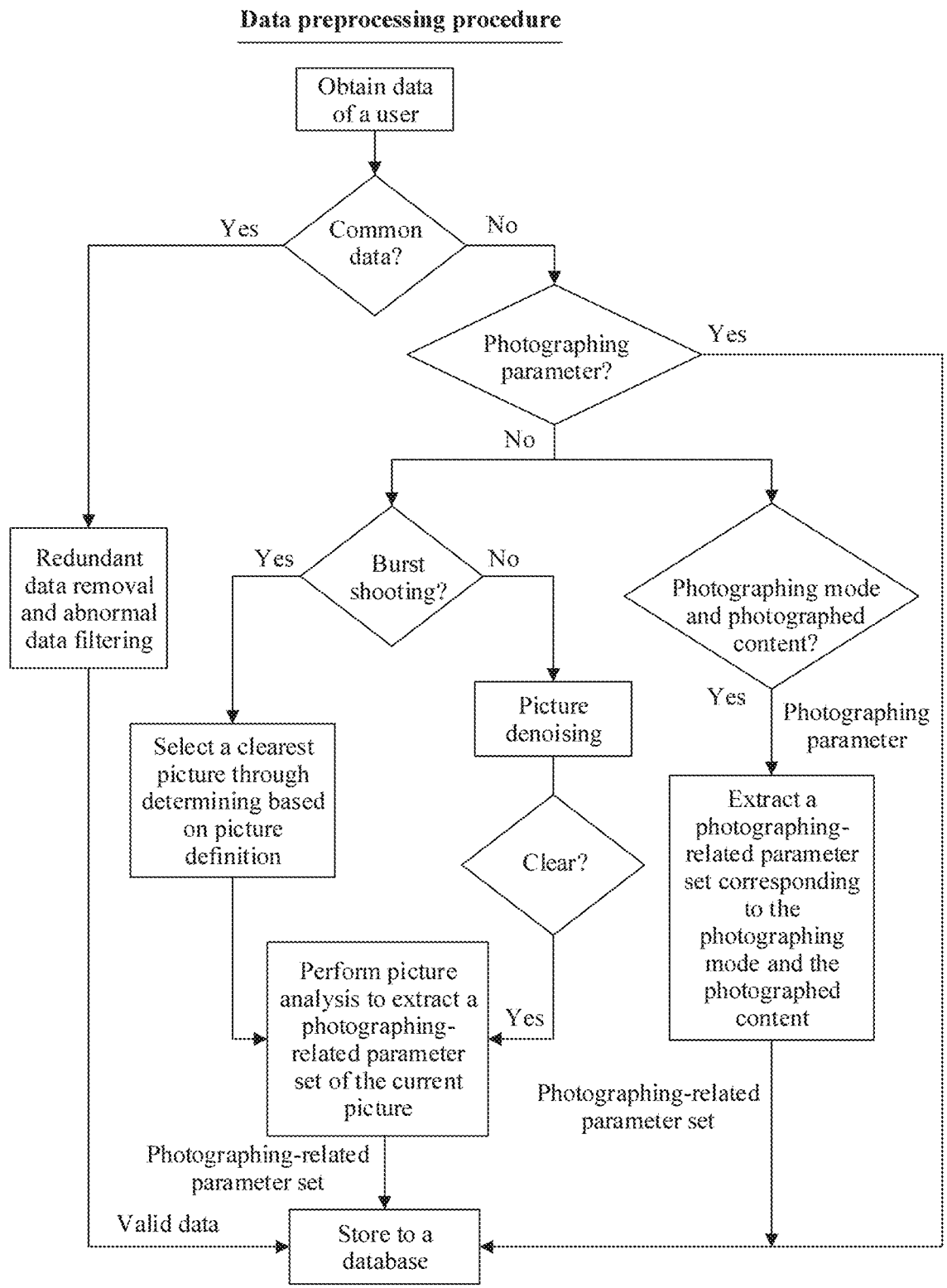
FIG. 8 is a schematic flowchart of user data preprocessing according to an embodiment of this application.

FIG. 8 shows a schematic flowchart of user data preprocessing. As shown in FIG. 8, a user data preprocessing procedure in FIG. 8 includes the following steps:

1. A terminal determines whether collected user data is common data. If the collected user data is common data, the terminal performs redundant data removal and abnormal data filtering on the collected common data, and stores, in a database of the user, the common data obtained after redundant data and abnormal data are removed. The database of the user may be on the local terminal or on a remote server, which is not limited herein.

The redundant data removal means that the terminal removes repeated data from the collected user data to reduce a size of valid common data to be stored in the database. For example, when the terminal collects the user data, a plurality of pieces of data may be collected by using different paths at each time of data collection performed by the terminal. In data collected by the terminal at a time, the terminal obtains from a life service application that the user sets a default express delivery address to "Shenzhen". In this case, the terminal may determine the default express delivery address as Habitual residence in the common data of the user. In other words, the terminal obtains that data of Habitual residence of the user is "Shenzhen". In addition, the terminal obtains, by using a positioning service function of a mobile phone, that a location address of the terminal in more than 20 days in one month is "Shenzhen" at night (for example, 23:00 to tomorrow 6:00). In this case, the terminal may determine the location address "Shenzhen" as Habitual residence of the user. In other words, the terminal obtains that data of Habitual residence of the user is that "Habitual residence is 'Shenzhen'". After obtaining the two same pieces of data of Habitual residence, the terminal may keep one piece of data of Habitual residence determined as valid data of Habitual residence, and store the valid data in the database of the user. For another example, when the terminal has stored "Shenzhen" as Habitual residence of the user in the database of the user, one piece of data in the user data collected by the terminal is that Habitual residence of the user is "Shenzhen", which is the same as Habitual residence that is of the user and that is stored in the database of the user. In this case, the terminal may remove the collected piece of data indicating that "Habitual residence of the user is 'Shenzhen'". The foregoing examples are merely used to explain this application and shall not be construed as a limitation.

The abnormal data filtering means that the terminal filters out and removes unreasonable data in the collected user data. Abnormal data may be generated. Unreasonable data may indicate that the data exceeds a value range of a data attribute. For example, the terminal may specify a value of an age data attribute of the user: A value interval of the age is 0 to 150 years old. If the terminal collects a piece of data indicating that the user is 200 years old that is not in the value interval of the age, the terminal determines that the piece of data is abnormal data, and filters out the abnormal data. The foregoing example is merely used to explain this application and shall not be construed as a limitation.

2. When the user data collected by the terminal is not common data, the terminal determines whether the collected user data is a photographing parameter; and if the collected user data is the photographing parameter, the terminal stores the photographing parameter in the database of the user.

The photographing parameter may include White balance, ISO. Exposure compensation, Shutter speed, Focusing mode. Metering mode, Luminance, Saturation, Contrast, Acutance, and the like.

3. When the user data collected by the terminal is neither common data nor a photographing parameter, if the terminal determines that the collected user data is a photographing mode or photographed content, the terminal extracts a photographing-related parameter set preset in the photographing mode or the photographed content, and stores, in the database of the user, the photographing-related parameter set extracted from the photographing mode or the photographed content. If no, the terminal determines whether the picture is clear. If the picture is clear, the terminal performs picture analysis on the picture to extract a photographing-related parameter set corresponding to the picture, and stores the photographing-related parameter set in the database of the user. For example, the terminal may determine whether a value of definition of the picture is greater than a preset definition threshold. If the value of definition of the picture is greater than the preset definition threshold, the picture is clear.

The following specifically describes a procedure in which the terminal performs feature extraction on the user data in this embodiment of this application.

1. The terminal performs feature extraction on the common data of the user.

Figure 9:
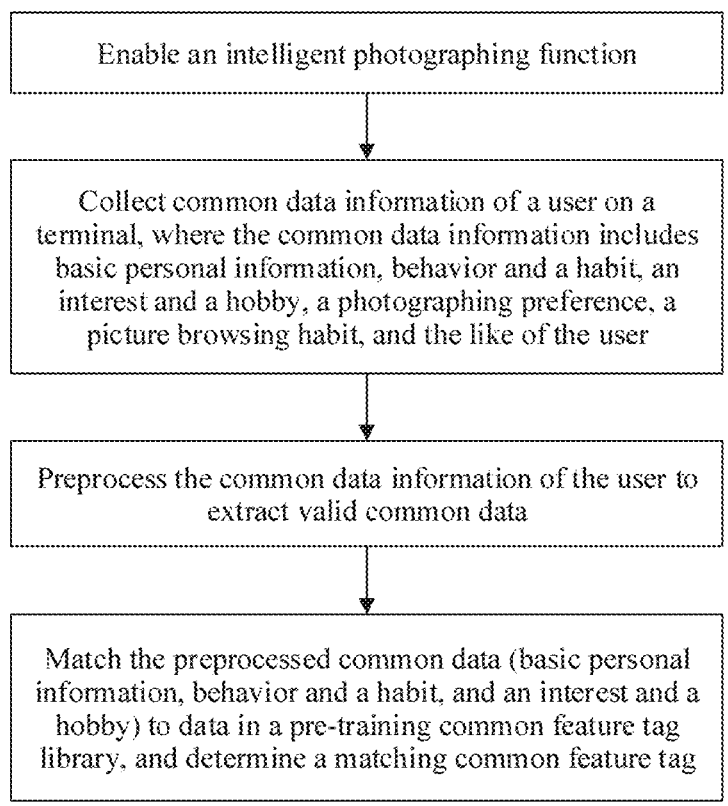
FIG. 9 is a schematic flowchart of extracting a common data feature of a user according to an embodiment of this application.

FIG. 9 is a flowchart in which a terminal extracts a common data feature of a user according to an embodiment of this application. As shown in FIG. 5, after the intelligent photographing function provided in this application is enabled, the terminal may collect data information of the user. The data information of the user that is collected by the terminal includes basic personal information, behavior and a habit, an interest and a hobby, a photographing preference, a picture browsing habit, and the like of the user. Then, the terminal performs, on the collected user data, the foregoing preprocessing procedure shown in FIG. 8, to extract valid source data. Finally, the terminal matches the preprocessed common data (including basic personal information, behavior and a habit, and an interest and a hobby) to data in a pre-training common feature tag library, and stores, in the database of the user, a feature value corresponding to a matching feature tag.

For example, the preprocessed common data of the terminal may be shown in Table 10 below.

TABLE 10

| | | Valid common data | |
|---|---|---|---|
| Data type | Subtype | Data attribute | Data value |
| Common data | Basic personal information | Gender | Female |
| | | Year of birth | 1994 |
| | | Habitual residence | Shenzhen |
| | Behavior and a habit | Most frequently used APP | Pitu |
| | | APP with a longest use time | WeChat |
| | | APP used after a headset is plugged in | NetEaseMusic |
| | | Frequently visited place | Seaside |
| | | Bedtime | 23:00 |
| | | Wake-up time | 8:00 |
| | Interest and a hobby | Reading preference | Romantic fiction and fashion magazine |
| | | Internet browsing habit | Frequently searching for a keyword "scenic spot" |

It can be learned from the valid common data shown in Table 10 that: the basic personal information of the user is that Gender is Female. Year of birth is 1994, and Habitual residence is Shenzhen the behavior and the habit of the user is that the most frequently used application is Pitu, the APP with a longest use time is WeChat, the APP that is used after a headset is plugged in is NetFaseMusic, the frequently visited place is seaside, the bedtime is 23:00, and the wake-up time is 8:00; and the interest and the hobby of the user is that the reading preference is romantic fiction and fashion magazine, and the Internet browsing habit is frequently searching for the keyword "scenic spot". Table 10 is merely used to explain this application and shall not be construed as a limitation. In specific implementation, the valid common data of the user may further include more information.

For example, a pre-training common feature tag library of the terminal may be shown in Table 11 below.

TABLE 11

| | Pre-training common feature tag library | | |
|---|---|---|---|
| Data attribute | Data value range of a feature tag | Feature tag | ID value of a feature tag |
| Gender | Male | Male | 0000 |
| | Female | Female | 0001 |
| Year of birth (current year: 2018) | 1978-2018 (40 years old and below) | Young people | 0002 |
| | 1959-1977 (41 years old to 59 years old) | Middle-aged people | 0003 |
| | Before-1958 (60 years old and above) | Old people | 0004 |

TABLE 11-continued

Pre-training common feature tag library

| Data attribute | Data value range of a feature tag | Feature tag | ID value of a feature tag |
|---|---|---|---|
| Behavior and a habit | A type of an APP that is frequently used or that is used for a longest time or that is used after a headset is plugged in is "Music" | Music | 0005 |
| | A type of an APP that is frequently used or that is used for a longest time or that is used after a headset is plugged in is "Shopping" | Shopping | 0006 |
| | A type of an APP that is frequently used or that is used for a longest time or that is used after a headset is plugged in is "Travel" | Travel | 0007 |
| | A type of an APP that is frequently used or that is used for a longest time or that is used after a headset is plugged in is "Game" | Game | 0008 |
| | A type of an APP that is frequently used or that is used for a longest time or that is used after a headset is plugged in is "Social activity" | Social activity | 0009 |
| | A type of an APP that is frequently used or that is used for a longest time or that is used after a headset is plugged in is "Entertainment" | Entertainment | 0010 |
| | A type of an APP that is frequently used or that is used for a longest time or that is used after a headset is plugged in is "Video" | Movie | 0011 |
| Interest and a hobby | A reading preference type is "Sports information" and the like | Sports | 0012 |
| | Average duration of reading an e-book is more than 30 minutes | Reading | 0013 |
| | Average duration of browsing news on the Internet is more than 30 minutes | News information | 0014 |
| | Frequently search the Internet for a keyword such as "Financial management" or "Investment" | Financial management | 0015 |
| | Frequently search the Internet for a keyword such as "Workplace" or "Work" | Commerce | 0016 |

It can be learned from the pre-training feature tag library shown in Table 11 that the feature ID value of the feature tag: Male is 0000, and the feature ID value of the feature tag: Female is 0001. The feature tag corresponding to Year of birth between 1978 and 2018 is "Young people", and the feature ID value of the feature tag is 0002. The feature tag corresponding to Year of birth between 1959 and 1977 is "Middle-aged people", and the feature ID value of the feature tag is 0003. The feature tag corresponding to Year of birth before 1958 is "Old people", and the feature ID value of the feature tag is 0004. A type of an APP that is frequently used or that is used for a longest time or that is used after a headset is plugged in is "Music" and correspond to the feature tag "Music" (the feature ID value is 0005). A type of an APP that is frequently used or that is used for a longest time or that is used after a headset is plugged in is "Shopping" and correspond to the feature tag "Shopping" (the feature ID value is 0006). A type of an APP that is frequently used or that is used for a longest time or that is used after a headset is plugged in is "Travel" and correspond to the feature tag "Travel" (the feature ID value is 0007). A type of an APP that is frequently used or that is used for a longest time or that is used after a headset is plugged in is "Game" and correspond to the feature tag "Game" (the feature ID value is 0008). A type of an APP that is frequently used or that is used for a longest time or that is used after a headset is plugged in is "Social activity" and correspond to the feature tag "Social activity" (the feature ID value is 0009). A type of an APP that is frequently used or that is used for a longest time or that is used after a headset is plugged in is "Entertainment" and correspond to the feature tag "Entertainment" (the feature ID value is 0010). A type of an APP that is frequently used or that is used for a longest time or that is used after a headset is plugged in is "Movie" and correspond to the feature tag "Movie" (the feature ID value is 0011). The feature tag corresponding to the read preference type "sports information" is "Sports" (the feature ID value is 0012). The feature tag corresponding to the average duration of reading an e-book that is more than 30 minutes is "Reading" (the feature ID value is 0013). The feature tag corresponding to the average duration of browsing news on the Internet that is more than 30 minutes is "News information" (the feature ID is value is 0014). The feature tag corresponding to the frequently searching the Internet for a keyword such as "Financial management" or "Investment" is "Financial management" (the feature ID value is 0015). The feature tag corresponding to the frequently searching the Internet for a keyword such as "Workplace" or "Work" is "Commerce" (the feature ID value is 0016). Table 11 is merely used to explain this application and shall not be construed as a limitation.

With reference to Table 10 and Table 11, the feature tag of the common data of the user may be shown in Table 12 below.

TABLE 12

Common feature tag of a user and a feature ID
value corresponding to the common feature tag

| Common feature tag of a user | Feature ID value corresponding to the common feature tag |
|---|---|
| Female | 0001 |
| Young people | 0002 |
| Music | 0005 |
| Shopping | 0006 |
| Travel | 0007 |
| Social activity | 0009 |

It can be learned from the common feature tag of the user shown in Table 12 that the common feature tag of the user includes Female (the feature ID value is 0001). Young people (the feature ID value is 0002), Music (the common feature ID value is 0004), Shopping (the feature ID value is 0006), Travel (the feature ID value is 0007), and Social activity (the feature ID value is 0009). The terminal may store the foregoing common feature tag in the database of the user in a form of a feature ID value. Table 12 is merely used to explain this application and shall not be construed as a limitation.

2. The terminal performs feature extraction on the photographing-related data of the user.

The following first describes a process in which the terminal trains a mapping function f(x) between a photographing-related parameter set P and a photographing feature tag vector set S by using a neural network (for example, a convolutional neural network (convolutional neural network, CNN)).

Figures 10A, 10B, 10C:
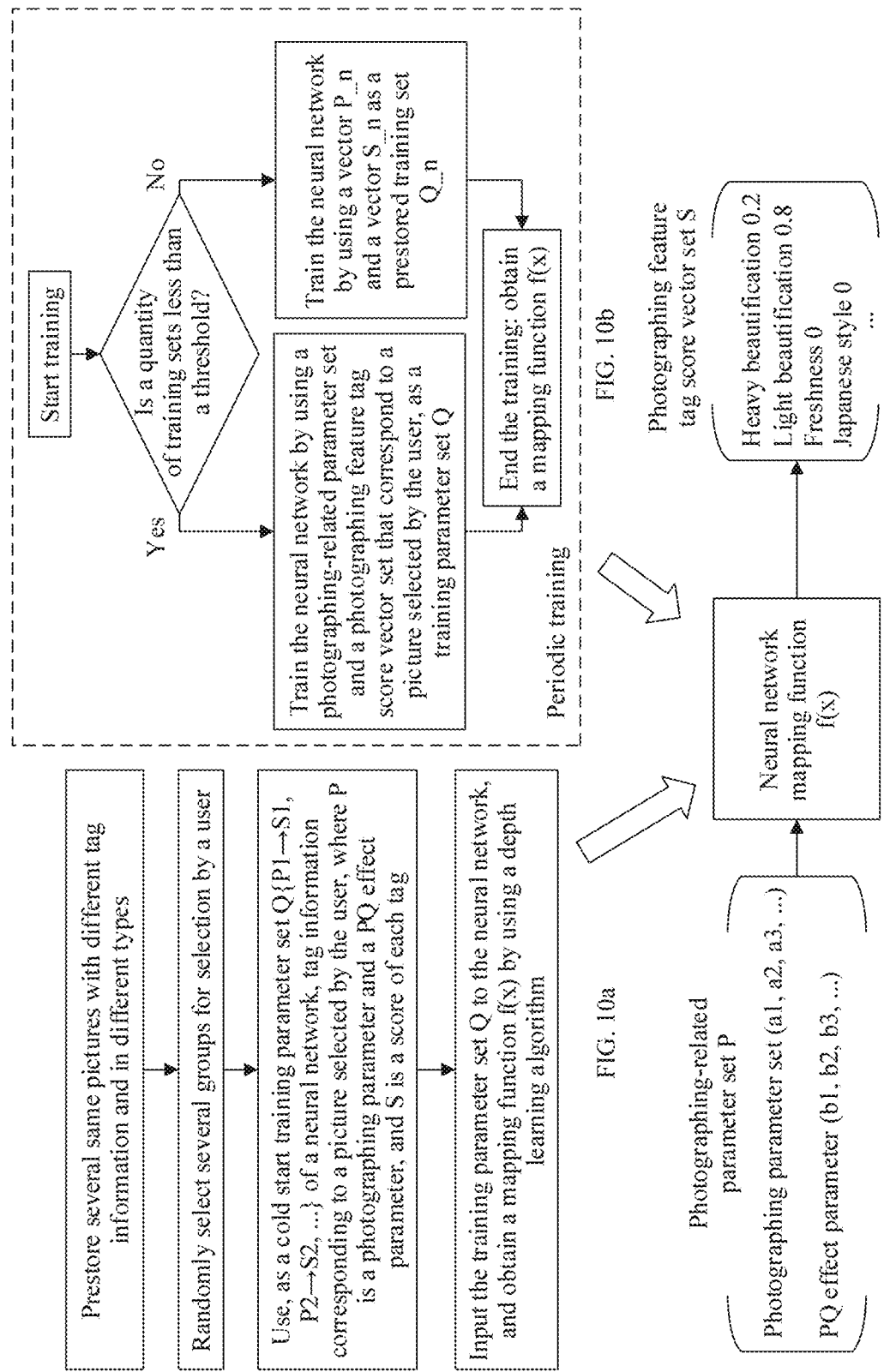
FIG. 10a, FIG. 10b, and FIG. 10c are a schematic flowchart of extracting a photographing-related data feature of a user according to an embodiment of this application.

FIG. 10a is a flowchart in which a terminal trains a neural network according to an embodiment of this application. As shown in FIG. 10a, first, a terminal may prestore several same pictures with different tag information and in different types. The tag information may be a photographing feature tag (for example, Heavy beautification, Light beautification, Freshness, and Japanese style) score vector set (for example, (a score of Heavy beautification, a score of Light beautification, a score of Freshness, and a score of Japanese style)) corresponding to a picture, and a photographing-related parameter set corresponding to the picture. In a group of pictures, different pictures correspond to different photographing-related parameter sets (including a photographing parameter set {a1, a2, a3, . . . } and a PQ effect parameter {b1, b2, b3, . . . }), and correspond to different photographing feature tag score vector sets S. Then, the terminal may select several groups (for example, 10 groups) for selection by the user. Next, the terminal may use, as a cold start training parameter set Q{P→S} of the neural network, tag information corresponding to a picture selected by the user. Herein, P includes a photographing parameter set and a PQ effect parameter set, and S is a score of a photographing feature tag (for example, Heavy beautification, Light beautification, Freshness, or Japanese style). Finally, the terminal may input the training parameter set Q to the neural network (for example, a convolutional neural network), and obtain a mapping function f(x) by using a depth learning algorithm.

For example, as shown in the 10 groups of effect pictures shown in FIG. 4d, the first group of effect pictures may include the picture a, the picture b, the picture c, and the picture d. After the terminal receives an input operation (for example, tapping the picture b) of selecting the picture b by the user, the terminal may input, as a group of cold start training parameter set Q_b{P_b→S_b} to the neural network, the photographing-related parameter set P_b and the photographing feature tag score vector set S_b that correspond to the picture b, to obtain the mapping function f(x) by using the depth learning algorithm. The terminal may receive a plurality of effect pictures selected by the user. The cold start training parameter set Q includes not only the photographing-related parameter set P_b and the photographing feature tag score vector set S_b that correspond to the picture b, but also a photographing-related parameter set P_e and a photographing feature tag score vector set S_e that correspond to another picture (for example, a picture e) selected by the user. For a specific part of content that is not described in detail, refer to the foregoing embodiment shown in FIG. 4. In this way, the terminal obtains the training set corresponding to the effect picture selected by the user, trains the neural network, so that a photographing feature tag score vector set output by using the trained training function f(x) conforms to a preference of the user, thereby improving user experience.

In a possible case, the terminal may periodically train the neural network. For example, a training period T may be 10 days, 15 days, one month, or longer.

As shown in FIG. 10b, before training a neural network model, the terminal may determine whether a quantity N of training sets required for this time of training is less than a threshold M (for example, 11). If the quantity N of training sets required for this time of training is less than the threshold M, the terminal may train the neural network model by using a training set (for example, Q_b{P_b→S_b}) including a photographing-related parameter set (for example, P_b corresponding to the picture b) and a photographing feature tag score vector set (for example, S_b corresponding to the picture b) that correspond to a picture selected by the user. If the quantity N of training sets required for this time of training is not less than the threshold M, the terminal may input a prestored training set Q_n{P_n→S_n} to the neural network model. Herein, P_n is a prestored photographing-related parameter set for training the neural network model, and S_n is prestored photographing feature tag score vector set for training the neural network model, to obtain the mapping function f(x). A quantity of prestored training sets is greater than the foregoing threshold M (for example, 11). In this way, when the neural network model is used to train the mapping function f(x), a larger quantity of training sets indicates that the photographing feature tag score vector set output by the terminal by using the trained mapping function f(x) better conforms to a preference of the user. Therefore, when an effect picture manually selected by the user corresponds to a relatively small quantity of training sets, the terminal may train the neural network model by using a prestored sample training set, so that the photographing feature tag score vector set output by using the mapping function f(x) better conforms to the preference of the user, thereby improving user experience.

The following describes a process in which the terminal extracts a photographing feature tag from photographing-related data of the user after the terminal completes training the neural network model.

As shown in FIG. 10c, after the terminal trains the neural network model to obtain the mapping function f(x), the terminal may input, as an input vector of the mapping function f(x) to the mapping function f(x) of the neural network model, the photographing-related parameter set P in the photographing-related data of the user that is collected by the terminal, to output the photographing feature tag score vector set S corresponding to the photographing-related data of the user. The terminal may extract a photographing feature tag with a highest score in the output photographing feature tag score vector set S, use the photographing feature tag as a photographing feature tag of the user, and store the photographing feature tag in a database of the user. Because the terminal collects a plurality of groups of photographing-related parameter sets P (for example, P_1, P_2, P_3, P_4, and P_8) in the photographing-related data of the user that is collected by the terminal, the terminal successively inputs the plurality of groups of photographing-related parameter sets P as input vectors to the mapping function f(x), to obtain a plurality of groups of photographing feature tag score vector sets S. In a possible case, the terminal may extract a plurality of photographing feature tags from the plurality of groups of photographing feature tag score vector sets S.

For example, with reference to Table 6, Table 8, and Table 9, the photographing-related parameter set P in the photographing-related data of the user that is collected by the terminal may be shown in Table 13 below.

TABLE 13

Photographing-related parameter set in photographing-related data of a user

| Data subtype | Data attribute | Photographing-related parameter set P |
| --- | --- | --- |
| Photographing mode | Common | P_1 |
|  | Aperture | P_2 |
|  | Portrait | P_3 |
|  | Food | P_4 |
|  | HDR | P_8 |
| Photographed content | Portrait | P_9 |
|  | Food | P_12 |
|  | Sunrise | P_13 |
|  | Sunset | P_14 |
| Shared picture | Picture_A | P_15 |
|  | Picture_B | P_16 |
| Deleted picture | Picture_C | P_17 |
|  | Picture_D | P_18 |
| Collected picture | Picture_E | P_19 |
|  | Picture_F | P_20 |
| Edited picture | Picture_G | P_21 |
|  | Picture_H | P_22 |

It can be learned from Table 13 that the photographing-related parameter sets P in the photographing-related data of the user that is collected by the terminal includes P_1, P_2, P_3, P_4, P_8, P_9, P_12, P_13, P_14, P_15, P_16, P_17, P_18, P_19, P_20, P_21, and P_22. Table 13 is merely used to explain this application and shall not be construed as a limitation.

The terminal may successively input the plurality of groups of photographing-related parameter sets P in Table 13 to the mapping function f(x), to obtain the photographing feature tag score vector sets S corresponding to the photographing-related parameter sets P; and extract a photographing feature tag with a highest score from each photographing feature tag score vector set S.

For example, the photographing feature tag score vector set S may be represented as $\{c_1, c_2, c_3, c_4, c_5, c_6\}$. Herein, $c_1$ is a score of the photographing feature tag "Heavy beautification", $c_2$ is a score of the photographing feature tag "Light beautification", $c_3$ is a score of the photographing feature tag "Freshness", $c_4$ is a score of the photographing feature tag "Japanese style", $c_5$ is a score of a photographing feature tag "European and American style", and $c_6$ is a score of a photographing feature tag "Freshness+Light beatification".

The photographing feature tag score vector set S corresponding to each photographing-related parameter set P in Table 13 and the photographing feature tag with the highest score in each photographing feature tag score vector set S may be shown in Table 14 below.

TABLE 14

Photographing feature tag score vector set corresponding to each photographing-related parameter set and a photographing feature tag with a highest score

| Photographing-related parameter set P | Photographing feature tag score vector set S: $\{c_1, c_2, c_3, c_4, c_5, c_6\}$ | Photographing feature tag with a highest score |
| --- | --- | --- |
| P_1 | S_1: {0.1, 0.3, 0.4, 0, 0, 0.2} | Freshness |
| P_2 | S_2: {0, 0.2, 0.8, 0, 0, 0} | Freshness |
| P_3 | S_3: {0.1, 0.1, 0.8, 0, 0, 0} | Freshness |
| P_4 | S_4: {0, 0.2, 0.2, 0.6, 0, 0} | Japanese style |
| P_8 | S_8: {0, 0.2, 0.6, 0, 0.2, 0} | Freshness |
| P_9 | S_9: {0, 0.2, 0.8. 0, 0, 0} | Japanese style |
| P_12 | S_12: {0, 0.5, 0.1, 0, 0.2, 0.2} | Light beautification |
| P_13 | S_13: {0, 0.4, 0, 0.2, 0.3, 0.3} | Light beautification |
| P_14 | S_14: {0, 0.5, 0.2, 0.2, 0.1, 0} | Light beautification |
| P_15 | S_15: {0, 0.1, 0.9, 0, 0, 0} | Freshness |
| P_16 | S_16: {0, 0.2, 0.4, 0, 0.2, 0.2} | Freshness |
| P_17 | S_17: {0, 0.2, 0.2, 0.3, 0.2, 0.1} | Japanese style |
| P_18 | S_18: {0, 0.2, 0.2, 0.4, 0, 0.2} | Japanese style |
| P_19 | S_19: {0, 0.7, 0.1, 0.1, 0.1, 0} | Light beautification |
| P_20 | S_20: {0, 0.5, 0.2, 0.3, 0, 0} | Light beautification |
| P_21 | S_21: {0, 0.2, 0.4, 0.1, 0.2, 0.1} | Freshness |
| P_22 | S_22: {0, 0.2, 0.6, 0.2, 0, 0} | Freshness |

It can be learned from Table 14 that the terminal performs feature extraction on the photographing-related data of the user. Extracted photographing feature tags of the user include Light beautification, Freshness, and Japanese style. In addition, the feature ID value corresponding to the photographing feature tag may be shown Table 15 below.

TABLE 15

Photographing feature tag of a user and a feature ID value corresponding to the photographing feature tag

| Photographing feature tag of a user | Feature ID value |
| --- | --- |
| Light beautification | 002 |
| Freshness | 003 |
| Japanese style | 004 |

It may be learned, from the photographing feature tag of the user and the feature ID value corresponding to the photographing feature tag that are shown in Table 15, that the feature ID value corresponding to the photographing feature tag "Light beautification" of the user is 002, the feature ID value corresponding to the photographing feature tag "Freshness" of the user is 003, and the feature ID value corresponding to the photographing feature tag "Japanese style" of the user is 004. The terminal may store the foregoing common feature tag in the database of the user in a form of a feature ID value. Table 15 is merely used to explain this application and shall not be construed as a limitation.

In a possible case, the photographing feature tag of the user may be a photographing feature tag whose score is greater than a first threshold in each photographing feature tag score vector set S. For example, the first threshold may be 0.7. With reference to Table 14, it can be learned that the photographing feature tag of the user includes "Freshness". The foregoing example is merely used to explain this application and shall not be construed as a limitation.

The following specifically describes a process in which the terminal performs feature tag fusion on a common feature tag of the user and a photographing feature tag of the user in an embodiment of this application.

Figure 11:
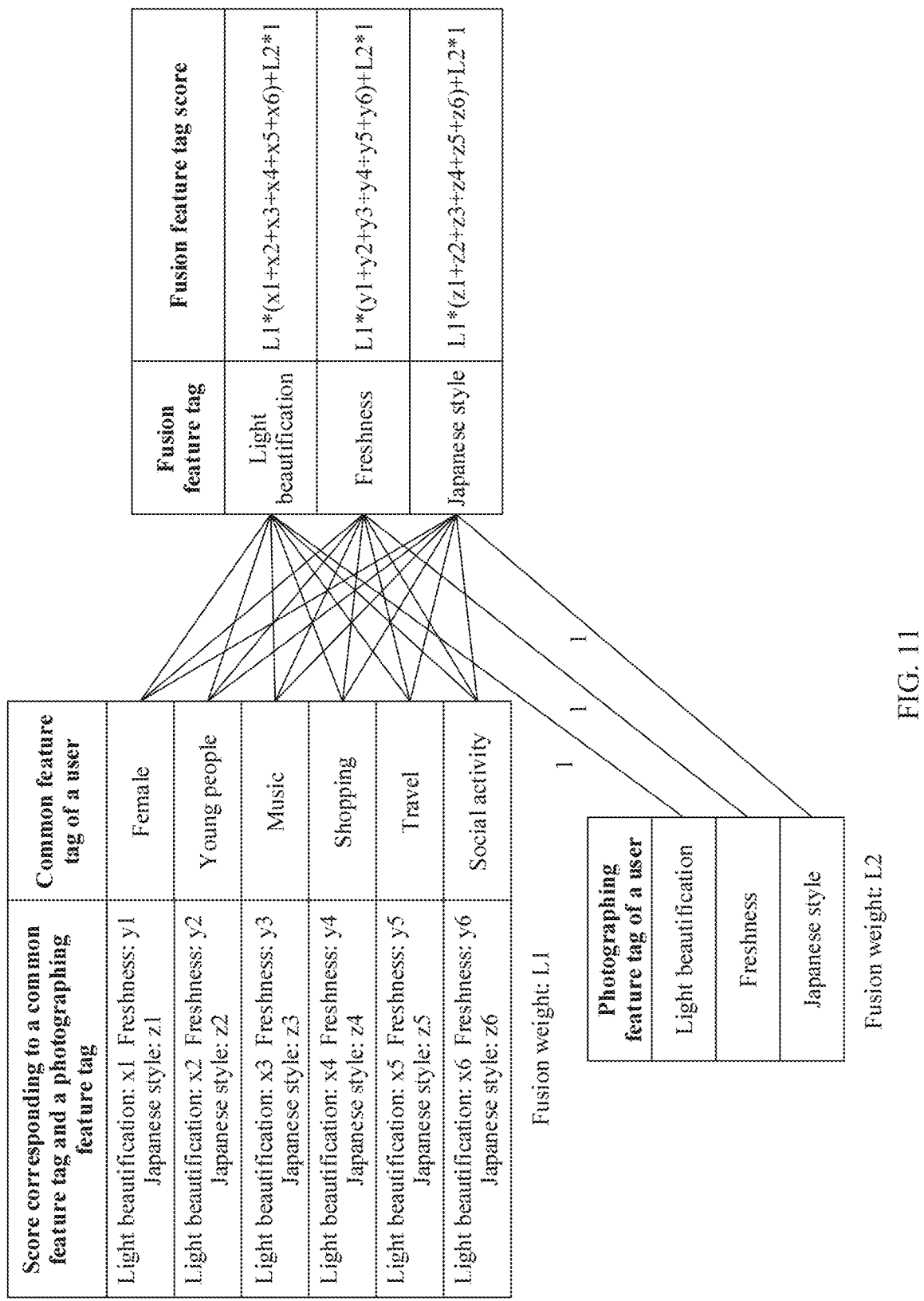
FIG. 11 is a schematic flowchart of feature tag fusion according to an embodiment of this application.

FIG. 11 shows a feature tag fusion process according to an embodiment of this application. As shown in FIG. 11, a common feature tag of a user may include Female, Young people, Music, Shopping, Travel, and Social activity. A photographing feature tag of the user may include Light beautification, Freshness, and Japanese style. Each common feature tag and each photographing feature tag correspond to a score. For example, a score corresponding to Female and Light beautification is x1, a score corresponding to Female and Freshness is y1, and a score corresponding to Female and Japanese style is z1. A score corresponding to Young people and Light beautification is x2, a score corresponding to Young people and Freshness is y2, and a score corresponding to Young people and Japanese style is z2. A score corresponding to Music and Light beautification is x3, a score corresponding to Music and Freshness is y3, and a score corresponding to Music and Japanese style is z3. A score corresponding to Shopping and Light beautification is x4, a score corresponding to Shopping and Freshness is y4, and a score corresponding to Shopping and Japanese style is z4. A score corresponding to Travel and Light beautification is x5, a score corresponding to Travel and Freshness is y5, and a score corresponding to Travel and Japanese style is z5. A score corresponding to Social activity and Light beautification is x6, a score corresponding to Social activity and Freshness is y6, and a score corresponding to Social activity and Japanese style is z6.

A fusion weight of the common feature tag of the user is L1, and a fusion weight of the photographing feature tag of the user is L2. A fusion feature tag obtained after the terminal performs feature tag fusion is the same as the photographing feature tag of the user. In other words, the fusion feature tag may include Light beautification, Freshness, and Japanese style. A fusion feature tag score T1 corresponding to the fusion feature tag "Light beautification" may be obtained through calculation by using the following Formula (1):

$$T1 = L1*(x1+x2+x3+x4+x5+x6)+L2*1 \qquad \text{Formula (1)}$$

In the foregoing Formula (1), L1 is the fusion weight of the common feature tag of the user, L2 is the fusion weight of the photographing feature tag of the user, x1 is a score corresponding to the common feature tag "Female" and the photographing feature tag "Light beautification", x2 is a score corresponding to the common feature tag "Young people" and the photographing feature tag "Light beautification", x3 is a score corresponding to the common feature tag "Music" and the photographing feature tag "Light beautification", x4 is a score corresponding to the common feature tag "Shopping" and the photographing feature tag "Light beautification", x5 is a score corresponding to the common feature tag "Travel" and the photographing feature tag "Light beautification", and x6 is a score corresponding to the common feature tag "Social activity" and the photographing feature tag "Light beautification".

A fusion feature tag score T2 corresponding to the fusion feature tag "Light beautification" may be obtained through calculation by using the following Formula (2):

$$T2 = L1*(y1+y2+y3+y4+y5+y6)+L2*1 \qquad \text{Formula (2)}$$

In the foregoing Formula (2), L1 is the fusion weight of the common feature tag of the user, L2 is the fusion weight of the photographing feature tag of the user, y1 is a score corresponding to the common feature tag "Female" and the photographing feature tag "Freshness", y2 is a score corresponding to the common feature tag "Young people" and the photographing feature tag "Freshness", y3 is a score corresponding to the common feature tag "Music" and the photographing feature tag "Freshness", y4 is a score corresponding to the common feature tag "Shopping" and the photographing feature tag "Freshness", y5 is a score corresponding to the common feature tag "Travel" and the photographing feature tag "Freshness", and y6 is a score corresponding to the common feature tag "Social activity" and the photographing feature tag "Freshness".

A fusion feature tag score T3 corresponding to the fusion feature tag "Light beautification" may be obtained through calculation by using the following Formula (3):

$$T3 = L1*(z1+z2+z3+z4+z5+z6)+L2*1 \qquad \text{Formula (3)}$$

In the foregoing Formula (3), L1 is the fusion weight of the common feature tag of the user. L2 is the fusion weight of the photographing feature tag of the user, z1 is a score corresponding to the common feature tag "Female" and the photographing feature tag "Japanese style", z2 is a score corresponding to the common feature tag "Young people" and the photographing feature tag "Japanese style", z3 is a score corresponding to the common feature tag "Music" and the photographing feature tag "Japanese style", z4 is a score corresponding to the common feature tag "Shopping" and the photographing feature tag "Japanese style", z5 is a score corresponding to the common feature tag "Travel" and the photographing feature tag "Freshness", and z6 is a score corresponding to the common feature tag "Social activity" and the photographing feature tag "Japanese style".

For example, the fusion weight L1 of the common feature tag of the user may be 0.6, and the fusion weight L2 of the common feature tag of the user may be 0.4. The score corresponding to the common feature tag and the photographing feature tag may be shown Table 16 below.

TABLE 16

Score corresponding to a common feature tag and a photographing feature tag

| Common feature tag | Photographing feature tag | | |
|---|---|---|---|
| | Light beautification | Freshness | Japanese style |
| Female | x1 = 0.3 | y1 = 0.5 | z1 = 0.2 |
| Young people | x2 = 0.2 | y2 = 0.7 | z1 = 0.1 |
| Music | x3 = 0.4 | Y3 = 0.2 | z1 = 0.4 |
| Shopping | x4 = 0.3 | Y4 = 0.6 | z1 = 0.1 |
| Travel | x5 = 0.3 | Y5 = 0.3 | z1 = 0.4 |
| Social activity | x6 = 0.4 | Y6 = 0.3 | z1 = 0.3 |

Based on Table 16, Formula (1). Formula (2), and Formula (3), the terminal may obtain the following through calculation: A fusion tag score T1 corresponding to the fusion feature tag "Light beautification" is 1.54, a fusion tag score T2 corresponding to the fusion feature tag "Freshness" is 1.96, and a fusion tag score T3 corresponding to the fusion feature tag "Japanese style" is 1.3. A fusion feature tag with a highest fusion feature tag score is Freshness.

The terminal may determine the fusion feature tag with the highest fusion feature tag score as an intelligent photographing tag of the user, and store the intelligent photographing tag in the database of the user. The intelligent photographing tag of the user may be used by the terminal to set a PQ effect parameter of a picture taken for the user during photographing.

The following describes the PQ effect parameter that is set when the user uses an intelligent photographing function to perform photographing in this embodiment of this application.

As shown in FIG. 12, a PQ effect parameter set corresponding to each fusion feature tag may be prestored in a terminal. For example, a PQ effect parameter set corresponding to a fusion feature tag "Light beautification" is a parameter set 1, a PQ effect parameter set corresponding to a fusion feature tag "Freshness" is a parameter set 2, and a PQ effect parameter set corresponding to a fusion feature tag "Japanese style" is a parameter set 3.

After calculating a fusion feature tag score corresponding to each fusion feature tag, the terminal may perform picture processing on a picture captured by the terminal during photographing, by using a PQ effect parameter set corresponding to a fusion feature tag (that is, an intelligent photographing tag) with a highest fusion feature tag score, to obtain a picture through intelligent photographing. For example, the fusion feature tag (that is, the intelligent photographing tag) with the highest fusion feature tag score may be "Freshness", and a PQ effect parameter set corresponding to the intelligent photographing tag "Freshness" is the parameter set 3. In other words, the terminal may perform picture processing on the picture captured by the terminal during photographing, by using the parameter set 3, to obtain the picture through intelligent photographing.

In the intelligent photographing method provided in this embodiment of this application, the terminal may collect user data, extract a feature tag of the user, and assist, based on the feature tag, the user in photographing with a photographing effect that conforms to a feature of the user, to provide the photographing effect that conforms to a personality of the user for the user, thereby improving user experience.

FIG. 13 shows a user database 1300 constructed by a data storage module in an intelligent photographing system according to an embodiment of this application. As shown in FIG. 13, the user database 1300 may include user data collected by a terminal, valid data obtained after preprocessing the collected user data, and feature value data corresponding to a feature tag of a user.

The user data may include common data and photographing-related data.

The valid data may include a photographing parameter (for example, a photographing parameter set 1, a photographing parameter set 2, and a photographing parameter set 3), a PQ effect parameter (for example, a PQ effect parameter set 1, a PQ effect parameter set 2, and a PQ effect parameter set 3), and valid common data (for example, data 1, data 2, and data 3).

The feature value data may include a common feature value (for example, a common feature ID 1, a common feature ID 2, and a common feature ID 3), a photographing-related feature value (for example, a photographing-related feature ID 1, a photographing-related feature ID 2, and a photographing-related feature ID 3), and a fusion feature value (for example, a fusion feature ID 1, a fusion feature ID 2, and a fusion feature ID 3). The common feature value is used to indicate a common feature tag of the user, and each common feature value corresponds to one common feature tag. The photographing-related feature value is used to indicate a photographing feature tag of the user, and each common feature value corresponds to one common feature tag. The fusion feature value is used to indicate a fusion feature tag of the user, and each fusion feature value corresponds to one fusion feature tag.

In this embodiment of this application, the user database 1300 is merely used to explain this application and shall not be construed as a limitation. In specific implementation, the user database 1300 may include more information, for example, a PQ effect parameter set corresponding to a fusion feature tag.

Figure 14:
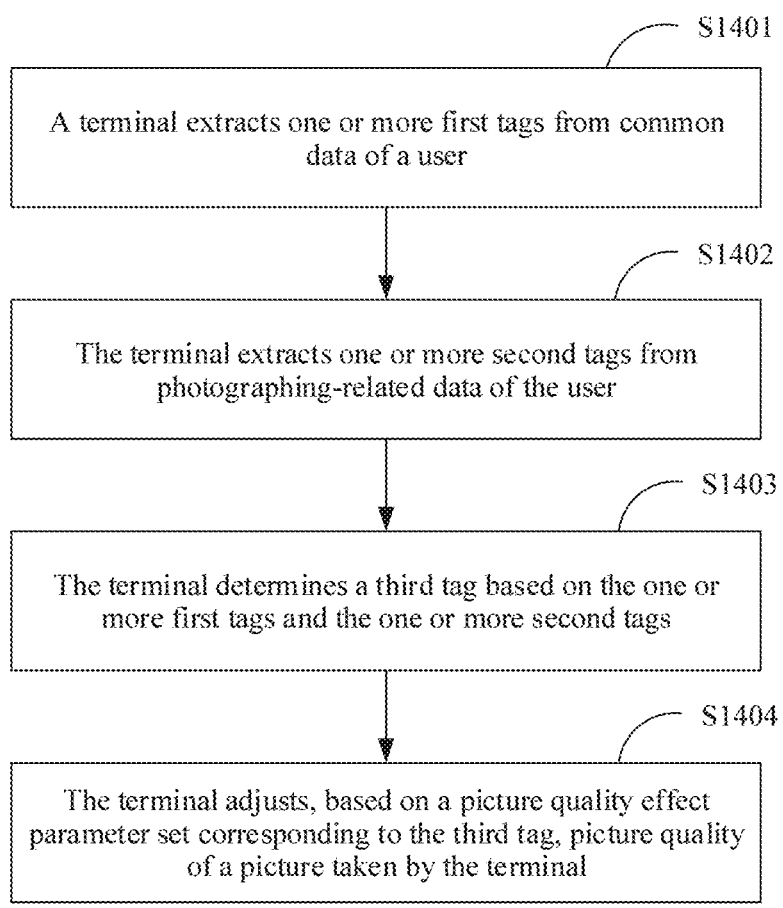
FIG. 14 is a schematic flowchart of an intelligent photographing method according to an embodiment of this application.

FIG. 14 is a schematic flowchart of an intelligent photographing method according to this application. As shown in FIG. 14, the intelligent photographing method includes the following steps.

S1401. A terminal extracts one or more first tags from common data of a user. The common data is used to represent an identity feature of the user.

The common data of the user may include basic personal information, behavior and a habit, an interest and a hobby, and the like of the user. The basic personal information may include Gender, Year of birth, Habitual residence, and the like. The behavior and the habit may include a most frequently used APP, an APP with a longest use time, an APP that is used after a headset is plugged in, a frequently visited place, a bedtime, a wake-up time, and the like of the user. The interest and the hobby may include a reading preference, an Internet browsing habit, and the like. For a procedure in which the terminal collects the user data, refer to the foregoing embodiments. Details are not described herein again.

For example, the one or more first tags extracted by the terminal may be a common feature tag of the user in the foregoing embodiments, for example, the common feature tag of the user in Table 12. The common feature tag of the user is Female, Young people, Music, Shopping, Travel, and Social activity. For a process in which the terminal extracts the one or more first tags from the common data of the user, refer to the foregoing common data feature extraction procedure in the embodiment shown in FIG. 9. Details are not described herein again.

S1402. The terminal extracts one or more second tags from photographing-related data of the user. The photographing-related data is used to represent a photographing preference of the user.

The photographing-related data of the user may include a photographing preference, a picture browsing habit, and the like of the user. The photographing preference of the user includes a photographing parameter, a photographing mode, photographed content, and the like. The picture browsing habit includes a shared picture, a deleted picture, a collected picture, an edited picture, and the like.

For example, the photographing parameter may include White balance, ISO, Exposure compensation, Shutter speed, Focusing mode. Metering mode, Luminance, Saturation, Contrast, Acutance, and the like. The photographing mode may include a common photographing mode, an aperture mode, a portrait mode, a food mode, a monochrome camera mode, a professional photographing mode, a 3D dynamic panorama mode, an HDR photographing mode, and the like. The foregoing examples are merely used to explain this application and shall not be construed as a limitation.

For example, the one or more second tags extracted by the terminal may be a photographing feature tag of the user in the foregoing embodiments. For example, the one or more second tags may be the photographing feature tag of the user that is shown in Table 15. The photographing feature tag of the user is Light beautification. Freshness, or Japanese style. The foregoing examples are merely used to explain this application and shall not be construed as a limitation.

For a process in which the terminal extracts the one or more second tags from the photographing-related data of the user, refer to the foregoing photographing-related data feature extraction procedure in the embodiment shown in FIG. 10. Details are not described herein again.

S1403. The terminal determines a third tag based on the one or more first tags and the one or more second tags.

The third tag may be an intelligent photographing tag in the foregoing embodiments, for example, the intelligent photographing tag in FIG. 12: Freshness. For a process in which the terminal determines the third tag based on the one or more first tags and the one or more second tags, refer to the foregoing feature tag fusion procedures shown in FIG. 11 and FIG. 12. Details are not described herein again.

S1404. The terminal adjusts, based on a picture quality effect parameter set corresponding to the third tag, picture quality of a picture taken by the terminal.

The picture quality (picture quality, PQ) effect parameter set may be used by the terminal to perform picture quality effect adjustment on a taken picture, for example, picture quality adjustment such as contrast adjustment, luminance adjustment, color saturation adjustment, hue adjustment, definition adjustment (for example, digital noise reduction (digital noise reduction. DNR) adjustment), and color edge enhancement (chroma TI, CTI) adjustment.

For example, the third tag may be the intelligent photographing tag in the embodiment shown in FIG. 12: Freshness, and the picture quality effect parameter set corresponding to the third tag may be the parameter set 3 in the embodiment shown in FIG. 12. For specific content, refer to content in the embodiment in FIG. 12. Details are not described herein again.

In a possible case, that the terminal extracts the one or more first tags from common data may specifically include: The terminal extracts, based on a first mapping relationship, the one or more first tags corresponding to the common data. The first mapping relationship includes mapping between a plurality of groups of common data and a plurality of first tags.

For example, the first mapping relationship may be a pre-training common feature tag library shown in Table 11 in the foregoing embodiment. By using the pre-training common feature tag library, the one or more first tags (Female, Young people, Music, Shopping, Travel. and Social activity) may be extracted from the common data. The foregoing example is merely used to explain this application and shall not be construed as a limitation. In this way, the terminal may match the common data with the first mapping relationship, to obtain a common feature tag of the user, that is, the first tag. Therefore, the terminal can quickly extract the common feature tag of the user.

In a possible case, that the terminal extracts one or more first tags from photographing-related data may specifically include: First, the terminal extracts one or more first photographing-related parameter sets from the photographing-related data. Then, the terminal inputs the one or more first photographing-related parameter sets to a first neural network model, to obtain one or more first score vector sets. The first score vector set includes first scores of a plurality of fourth tags, and the first score is used to represent a matching degree between the first photographing-related parameter set and the fourth tag. Next, the terminal determines the one or more second tags in the plurality of fourth tags based on the first score vector sets respectively corresponding to the one or more first photographing-related parameter sets.

For example, the first neural network model may be a convolutional neural network (convolutional neural network, CNN). The first photographing-related parameter set includes a photographing parameter set {a1, a2, a3, . . . } and a PQ effect parameter set {b1, b2, b3, . . . } of the photographing-related data. The plurality of fourth tags may be photographing feature tags (for example, Heavy beautification. Light beautification. Freshness, Japanese style, European and American style, and Freshness+Light beautification) in the example shown in Table 14. For the first score vector set, refer to the photographing feature tag score vector set S in the example shown in Table 14. For specific content, refer to the example shown in FIG. 10. Details are not described herein again. In other words, the terminal may extract the feature tag from the photographing-related data by using the neural network model. In this way, the terminal may use a self-learning capability of the neural network model to improve accuracy of extracting the feature tag from the photographing-related data by the terminal.

In a possible case, the one or more second tags include one or more fourth tags whose first scores are greater than a first threshold in the first score vector sets respectively corresponding to the one or more first photographing-related parameter sets.

For example, the first threshold may be 0.7. With reference to Table 14, it can be learned that the photographing feature tag of the user may include "Freshness". For specific content, refer to the embodiments shown in Table 14 and Table 15. Details are not described herein again.

In a possible case, the one or more second tags include one or more fourth tags whose first scores are the highest in a first score vector set corresponding to each first photographing-related parameter set.

For example, the one or more second tags may be the photographing feature tag (for example, Light beautification, Freshness, and Japanese style) of the user that is shown in Table 15. For specific content, refer to the embodiments shown in Table 14 and Table 15. Details are not described herein again. In other words, the terminal may determine, as the one or more second tags, the one or more fourth tags whose fourth scores are greater than the first threshold. Because a value of the first score is used to indicate a matching degree between the user and the fourth tag, a larger value of the first score indicates a higher matching degree between the photographing-related data of the user and the fourth tag. In this way, the terminal may extract the one or more second tags that conform to a photographing-related data feature of the user.

In a possible case, before the terminal inputs the one or more first photographing-related parameter sets to the first neural network model, the terminal may obtain sample data. The sample data includes a plurality of groups of first training sets. Each group of first training sets include one group of second photographing-related parameter sets and one group of second score vector sets. The terminal trains the first neural network model based on the sample data by using a deep learning algorithm.

For example, the first training set may be the training parameter set Q{P→S} in the embodiment shown in FIG. 10. Herein, P includes a photographing parameter set and a PQ effect parameter set, and S is a score of a photographing feature tag (for example, Heavy beautification, Light beautification, Freshness, or Japanese style). The second photographing-related parameter set may include a photographing parameter and a PQ effect parameter. The second score vector set may include a score of a photographing feature tag (for example, Heavy beautification, Light beautification, Freshness, or Japanese style). For specific content, refer to the embodiment shown in FIG. 10. Details are not described herein again. In other words, the terminal extracts the one or more fourth tags with the highest first scores in the first score vector sets of the user, and determines the one or more second tags. In this way, the terminal can improve accuracy of extracting the one or more second tags of the user.

In a possible case, the terminal displays a first interface. The first interface includes a plurality of sample pictures. Each sample picture corresponds to one group of second photographing-related parameter sets and one group of second score vector sets. The second photographing-related parameter set is used to represent picture quality of the sample picture, and the second score vector set includes first scores of a plurality of fourth tags corresponding to the sample picture. The terminal receives a first input operation of selecting one or more training pictures from the plurality of sample pictures by the user. In response to the first input operation, the terminal may determine, as the sample data, the second photographing-related parameter sets and the second score vector sets corresponding to the one or more training pictures.

For example, the first interface may be the user preference survey interface 440 shown in FIG. 4*d* or the user preference survey interface 530 shown in FIG. 5*b*. The sample picture may be the picture a, the picture b, the picture c, the picture d, and the like in the user preference survey interface 440 or the user preference survey interface 530. The first input operation may be the input operation 442 shown in FIG. 4*d* or the input operation 532 shown in FIG. 5*b*. For specific content, refer to the embodiment shown in FIG. 4 or FIG. 5. Details are not described herein again. In other words, the terminal may train the first neural network model by using sample data corresponding to a sample picture preselected by the user. In this way, the terminal may extract one or more second feature tags that conform to a personalized photographing preference of the user.

In a possible case, the terminal may determine whether a quantity of sample pictures is less than a training quantity. If the quantity of sample pictures is less than the training quantity, the terminal selects, as the sample data, one or more groups of second photographing-related parameter sets and second score vector sets from a prestored training set database. For specific content, refer to the embodiment shown in FIG. 10*b*. Details are not described herein again. In other words, the terminal may use a prestored training set to train a first neural network when the quantity of sample pictures selected by the user is insufficient, thereby reducing input operations of the user and improving user experience. In a possible case, each first tag and each second tag jointly correspond to an association score. A value of the association score is used to represent an association degree between the first tag and the second tag. The terminal may determine a total association score of each second tag based on the one or more first tags and the one or more second tags, to obtain $T_i = L_1 * (\sum_{k=1}^{R} W_k) + L_2$. Herein. $T_i$ is a total association score of an $i^{th}$ second tag in the one or more second tags, $L_1$ is a weight of the one or more first tags. $L_2$ is a weight of the one or more second tags, $W_k$ is an association score corresponding to a $k^{th}$ first tag in the one or more first tags and the $i^{th}$ second tag jointly, and R is a quantity of the one or more first tags. Then, the terminal determines the third tag based on the total association score of each second tag. The third tag is a tag with a highest total association score in the one or more second tags.

For example, the association score may be a score (for example, x1, x2, x3, x4, x5, x6; y1, y2, y3, y4, y5, y6; z1, z2, z3, z4, z5, z6 in the embodiment shown in FIG. 11) corresponding to the common feature tag and the photographing feature tag in the embodiment shown in FIG. 11. Reference may be made to the embodiment shown in FIG. 16. The third tag may be the intelligent photographing tag in the embodiment shown in FIG. 11. For the total association score of each second tag, refer to the fusion feature tag scores T1, T2, and T3 in the embodiment shown in FIG. 11. For specific content, refer to the embodiment shown in FIG. 11. Details are not described herein again. In other words, the terminal may set a weight for the first tag of the user and a weight for the second tag of the user, and set an association degree value corresponding to each first tag and each second tag. In this way, the terminal can recommend a picture quality adjustment parameter to the user, to better conform to a personalized preference of the user, thereby improving user experience.

In this embodiment of this application, the terminal may collect user data, extract the first tag indicating the identity feature of the user, extract the second tag indicating the photographing preference of the user, and obtain the third tag of the user through fusion based on the first tag and the second tag. In other words, the third tag is obtained through fusing the identity feature of the user with the photographing preference of the user. Then, the terminal assists, by using the picture quality effect parameter set corresponding to the third tag, the user in photographing with a photographing effect conforming to a user feature, and provides the user with the photographing effect conforming to a user personality, thereby improving user experience.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An intelligent photographing method implemented by a terminal, wherein the method comprises:
    extracting, based on a first mapping relationship, one or more first tags from common data of a user, wherein the common data represents an identity feature of the user, and wherein the first mapping relationship comprises mappings between a plurality of groups of the common data and a plurality of the one or more first tags;
    extracting one or more second tags from photographing-related data of the user, wherein the photographing-related data represents a photographing preference of the user;
    determining, based on the one or more first tags and the one or more second tags, a third tag;
    taking a picture; and
    adjusting, based on a picture quality effect parameter set corresponding to the third tag, a picture quality of the picture.

2. The intelligent photographing method of claim 1, further comprising:
    extracting, from the photographing-related data, one or more first photographing-related parameter sets;
    inputting the one or more first photographing-related parameter sets to a first neural network model to obtain one or more first score vector sets, wherein the one or more first score vector sets comprise first scores of a plurality of fourth tags, and wherein each of the first scores represents a matching degree between a corresponding first photographing-related parameter set and a corresponding fourth tag; and determining, based on the first score vector sets, the one or more second tags in the fourth tags.

3. The intelligent photographing method of claim 2, wherein the one or more second tags comprise one or more fourth tags having first scores that are greater than a first threshold.

4. The intelligent photographing method of claim 2, wherein the one or more second tags comprise one or more fourth tags having first scores that are highest in a first score vector set corresponding to each of the one or more first photographing-related parameter sets.

5. The intelligent photographing method of claim 2, wherein before inputting the one or more first photographing-related parameter sets to the first neural network model, the intelligent photographing method further comprises:

obtaining sample data comprising a plurality of groups of first training sets, wherein each of the groups of the first training sets comprises one group of second photographing-related parameter sets and one group of second score vector sets; and training the first neural network model based on the sample data using a deep learning algorithm.

6. The intelligent photographing method of claim 5, further comprising:

displaying a first interface comprising a plurality of sample pictures, wherein each of the sample pictures corresponds to the one group of the second photographing-related parameter sets and the one group of the second score vector sets, wherein each of the second photographing-related parameter sets represents picture qualities of the sample pictures, and wherein each of the second score vector sets comprises first scores of a second plurality of fourth tags corresponding to the sample pictures;

receiving, from the user, a first input operation of selecting one or more training pictures from the sample pictures; and setting, in response to the first input operation, the one or more first photographing-related parameter sets and the second score vector sets that are corresponding to the one or more training pictures as the sample data.

7. The intelligent photographing method of claim 6, further comprising:

determining whether a quantity of the sample pictures is less than a training quantity; and extracting one or more groups of the first training sets from a prestored training set database as the sample data when the quantity of the sample pictures is less than the training quantity.

8. The intelligent photographing method of claim 1, wherein each of the one or more first tags and each of the one or more second tags jointly correspond to an association score, wherein a value of the association score represents a degree of association between each of the one or more first tags and each of the one or more second tags, and wherein the intelligent photographing method further comprises:

determining a total association score of the each of the one or more second tags based on the one or more first tags and the one or more second tags using a formula:

$$T_i = L_1 * \left(\sum_{k=1}^{R} W_k\right) + L_2,$$

wherein $T_i$ is a total association score of an $i^{th}$ second tag in the one or more second tags, wherein $L_1$ is a weight of the one or more first tags, wherein $L_2$ is a weight of the one or more second tags, wherein $W_k$ is an association score corresponding to a $k^{th}$ first tag in the one or more first tags and the $i^{th}$ second tag, and wherein R is a quantity of the one or more first tags; and determining, based on the total association score, the third tag, wherein the third tag is with a highest total association score in the one or more second tags.

9. An electronic device comprising:

a memory configured to store instructions; and a processor coupled to the memory, wherein the instructions cause the processor to be configured to:

extract, based on a first mapping relationship, extract one or more first tags from common data of a user, wherein the common data represents an identity feature of the user, and wherein the first mapping relationship comprises mapping between a plurality of groups of the common data and a plurality of the one or more first tags;

extract one or more second tags from photographing-related data of the user, wherein the photographing-related data represents a photographing preference of the user;

determine, based on the one or more first tags and the one or more second tags, a third tag;

take a picture; and adjust, based on a picture quality effect parameter set corresponding to the third tag, a picture quality of the picture.

10. The electronic device of claim 9, wherein the instructions further cause the electronic device to:

extract, from the photographing-related data, one or more first photographing-related parameter sets;

input the one or more first photographing-related parameter sets to a first neural network model to obtain one or more first score vector sets, wherein the one or more first score vector sets comprise first scores of a plurality of fourth tags, and wherein each of the first scores represents a matching degree between a corresponding first photographing-related parameter set and a corresponding fourth tag; and determine, based on the first score vector sets, the one or more second tags in the fourth tags.

11. The electronic device of claim 10, wherein the one or more second tags comprise one or more fourth tags having first scores that are greater than a first threshold.

12. The electronic device of claim 10, wherein the one or more second tags comprise one or more fourth tags having first scores that are highest in a first score vector set corresponding to each of the one or more first photographing-related parameter sets.

13. The electronic device according to claim 10, wherein the instructions further cause the processor to be configured to:

obtain sample data comprising a plurality of groups of first training sets, wherein each of the groups of the first training sets comprises one group of second photographing-related parameter sets and one group of second score vector sets; and train the first neural network model based on the sample data using a deep learning algorithm.

14. The electronic device of claim 13, wherein the instructions further cause the processor to be configured to:

display a first interface comprising a plurality of sample pictures, wherein each of the sample pictures corresponds to the one group of the second photographing-related parameter sets and the one group of the second score vector sets, wherein each of the second photographing-related parameter sets represents picture qualities of the sample pictures, and wherein each of the second score vector sets comprises first scores of a second plurality of fourth tags corresponding to the sample pictures;

receive, from the user, a first input operation of selecting one or more training pictures from the sample pictures; and set, in response to the first input operation, the one or more first photographing-related parameter sets and the second score vector sets that are corresponding to the one or more training pictures as the sample data.

15. The electronic device of claim 14, wherein the instructions further cause the processor to be configured to:

determine whether a quantity of the sample pictures is less than a training quantity; and extract one or more groups of the first training sets from a prestored training set database as the sample data when the quantity of the sample pictures is less than the training quantity.

16. The electronic device of claim 9, wherein each of the one or more first tags and each of the one or more second tags jointly correspond to an association score, wherein a value of the association score represents a degree of association between each of the one or more first tags and each of the one or more second tags, and wherein the instructions further cause the processor to be configured to:

determine a total association score of the each of the one or more second tags based on the one or more first tags and the one or more second tags using a formula:

$$T_i = L_1 * \left(\sum_{k=1}^{R} W_k\right) + L_2,$$

wherein $T_i$ is a total association score of an $i^{th}$ second tag in the one or more second tags, wherein $L_1$ is a weight of the one or more first tags, wherein $L_2$ is a weight of the one or more second tags, wherein $W_k$ is an association score corresponding to a $k^{th}$ first tag in the one or more first tags and the $i^{th}$ second tag, and wherein R is a quantity of the one or more first tags; and further determine, based on the total association score, the third tag, wherein the third tag is with a highest total association score in the one or more second tags.

17. A computer program product comprising computer-executable instructions stored on a non-transitory computer-readable medium that, when executed by a processor, cause an apparatus to:

extract, based on a first mapping relationship, one or more first tags from common data of a user, wherein the common data represents an identity feature of the user, and wherein the first mapping relationship comprises mapping between a plurality of groups of the common data and a plurality of the one or more first tags;

extract one or more second tags from photographing-related data of the user, wherein the photographing-related data represents a photographing preference of the user;

determine, based on the one or more first tags and the one or more second tags, a third tag;

take a picture; and adjust, based on a picture quality effect parameter set corresponding to the third tag, a picture quality of the picture.

18. The computer program product of claim 17, wherein the instructions further cause the apparatus to:

extract, from the photographing-related data, one or more first photographing-related parameter sets;

input the one or more first photographing-related parameter sets to a first neural network model to obtain one or more first score vector sets, wherein the one or more first score vector sets comprise first scores of a plurality of fourth tags, and wherein each of the first scores represents a matching degree between a corresponding first photographing-related parameter set and a corresponding fourth tag; and determine, based on the first score vector sets, the one or more second tags in the fourth tags.

19. The computer program product of claim 17, wherein each of the one or more first tags and each of the one or more second tags jointly correspond to an association score, wherein a value of the association score represents a degree of association between each of the one or more first tags and each of the one or more second tags, and wherein the instructions further cause the apparatus to:

determine a total association score of the each of the one or more second tags based on the one or more first tags and the one or more second tags using a formula:

$$T_i = L_1 * \left(\sum_{k=1}^{R} W_k\right) + L_2,$$

wherein $T_i$ is a total association score of an $i^{th}$ second tag in the one or more second tags, wherein $L_1$ is a weight of the one or more first tags, wherein $L_2$ is a weight of the one or more second tags, wherein $W_k$ is an association score corresponding to a $k^{th}$ first tag in the one or more first tags and the $i^{th}$ second tag, and wherein R is a quantity of the one or more first tags; and determine, based on the total association score, the third tag, wherein the third tag is with a highest total association score in the one or more second tags.

* * * * *

UNITED STATES PATENT AND TRADEMARK OFFICE
CERTIFICATE OF CORRECTION

PATENT NO. : 11,470,246 B2  
APPLICATION NO. : 17/284906  
DATED : October 11, 2022  
INVENTOR(S) : Fengxia Kang et al.

Page 1 of 1

It is certified that error appears in the above-identified patent and that said Letters Patent is hereby corrected as shown below:

In the Claims

Claim 9, Column 50, Line 15: "relationship, extract" should read "relationship,"

Signed and Sealed this  
Twenty-ninth Day of November, 2022

Katherine Kelly Vidal  
*Director of the United States Patent and Trademark Office*